(12) United States Patent
Heller et al.

(10) Patent No.: US 7,827,259 B2
(45) Date of Patent: Nov. 2, 2010

(54) METHOD AND SYSTEM FOR CONFIGURABLE AUTOMATIC MEDIA SELECTION

(75) Inventors: David Heller, San Jose, CA (US); Jeffrey L. Robbin, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 1339 days.

(21) Appl. No.: 10/833,399

(22) Filed: Apr. 27, 2004

(65) Prior Publication Data
US 2005/0240661 A1    Oct. 27, 2005

(51) Int. Cl.
G06F 15/173    (2006.01)
G06F 15/16    (2006.01)

(52) U.S. Cl. .................... 709/223; 709/203; 709/231

(58) Field of Classification Search ................ 709/203, 709/223, 217, 231
See application file for complete search history.

(56) References Cited

U.S. PATENT DOCUMENTS

| | | | |
|---|---|---|---|
| 3,990,710 A | 11/1976 | Hughes | |
| 4,528,643 A | 7/1985 | Freeny, Jr. | |
| 4,851,931 A | 7/1989 | Parker et al. | |
| 5,168,481 A | 12/1992 | Culbertson et al. | |
| 5,181,107 A | 1/1993 | Rhoades | |
| 5,191,573 A | 3/1993 | Hair | |
| 5,341,350 A | 8/1994 | Frank et al. | |
| 5,355,302 A | 10/1994 | Martin et al. | |
| 5,418,713 A | 5/1995 | Allen | |
| 5,428,735 A | 6/1995 | Kahl et al. | |
| 5,481,509 A | 1/1996 | Knowles | |
| 5,504,852 A | 4/1996 | Thompson-Rohrlich | |
| 5,559,945 A | 9/1996 | Beaudet et al. | |
| 5,561,604 A | 10/1996 | Buckley et al. | |
| 5,566,353 A | 10/1996 | Cho et al. | |
| 5,583,993 A | 12/1996 | Foster et al. | |
| 5,587,404 A | 12/1996 | Kroner et al. | |
| 5,616,876 A | 4/1997 | Cluts | |
| 5,633,839 A | 5/1997 | Alexander et al. | |
| 5,640,566 A | 6/1997 | Victor et al. | |
| 5,666,530 A | 9/1997 | Clark et al. | |

(Continued)

FOREIGN PATENT DOCUMENTS

EP    0 917 077    5/1999

(Continued)

OTHER PUBLICATIONS

"iTunes Celebrates Its First Anniversary; Over 70 Million Songs Purchased," Apr. 28, 2004, http://www.apple.com/pr/library/2004/apr/28itunes.html.

(Continued)

*Primary Examiner*—Hussein A Elchanti

(57) ABSTRACT

Techniques for repeatedly selecting and presenting media items at a media device are disclosed. In one embodiment, media items are automatically (or dynamically) selected from a media source (e.g., list of media items) and then presented at a media device. As a result, the selected media items can be continuously selected and presented in an automated manner. In one embodiment, the automatic selection of the media items can be performed in accordance with at least one criterion. The at least one criterion can be user-specified and/or rules-based. In one embodiment, a display screen can display information pertaining to recently presented media items, media item being presented, and upcoming media items to be presented.

51 Claims, 11 Drawing Sheets

U.S. PATENT DOCUMENTS

| | | | |
|---|---|---|---|
| 5,710,922 | A | 1/1998 | Alley et al. |
| 5,714,971 | A | 2/1998 | Shalit et al. |
| 5,721,949 | A | 2/1998 | Smith et al. |
| 5,726,909 | A | 3/1998 | Krikorian |
| 5,727,202 | A | 3/1998 | Kucala |
| 5,734,823 | A | 3/1998 | Saigh et al. |
| 5,739,451 | A | 4/1998 | Winksy et al. |
| 5,740,134 | A | 4/1998 | Peterson |
| 5,819,160 | A | 10/1998 | Foladare et al. |
| 5,835,721 | A | 11/1998 | Donahue et al. |
| 5,835,732 | A | 11/1998 | Kikinis et al. |
| 5,845,282 | A | 12/1998 | Alley et al. |
| 5,864,868 | A | 1/1999 | Contois |
| 5,875,110 | A | 2/1999 | Jacobs |
| 5,897,642 | A | 4/1999 | Capossela et al. |
| 5,918,213 | A | 6/1999 | Bernard et al. |
| 5,918,303 | A | 6/1999 | Yamaura et al. |
| 5,923,757 | A | 7/1999 | Hocker et al. |
| 5,925,843 | A | 7/1999 | Miller et al. |
| 5,963,916 | A | 10/1999 | Kaplan |
| 5,969,283 | A | 10/1999 | Looney et al. |
| 5,983,069 | A | 11/1999 | Cho et al. |
| 5,995,098 | A | 11/1999 | Okada et al. |
| 6,000,000 | A | 12/1999 | Hawkins et al. |
| 6,006,274 | A | 12/1999 | Hawkins et al. |
| 6,038,199 | A | 3/2000 | Pawlowski et al. |
| 6,041,023 | A | 3/2000 | Lakhansingh |
| 6,052,797 | A | 4/2000 | Ofek et al. |
| 6,061,306 | A | 5/2000 | Buchheim |
| 6,125,369 | A | 9/2000 | Wu et al. |
| 6,172,948 | B1 | 1/2001 | Keller et al. |
| 6,208,044 | B1 | 3/2001 | Viswanadham et al. |
| 6,216,131 | B1 | 4/2001 | Liu et al. |
| 6,243,328 | B1 | 6/2001 | Fenner et al. |
| 6,243,725 | B1 | 6/2001 | Hempleman et al. |
| 6,247,135 | B1 | 6/2001 | Feague |
| 6,248,946 | B1 | 6/2001 | Dwek |
| 6,255,961 | B1 | 7/2001 | Van Rzin et al. |
| 6,272,545 | B1 | 8/2001 | Flanagin et al. |
| 6,283,764 | B2 | 9/2001 | Kajiyama et al. |
| 6,295,541 | B1 | 9/2001 | Bodnar et al. |
| 6,332,175 | B1 | 12/2001 | Birrell et al. |
| 6,338,044 | B1 | 1/2002 | Cook et al. |
| 6,341,316 | B1 | 1/2002 | Kloba et al. |
| 6,356,971 | B1 | 3/2002 | Katz et al. |
| 6,380,947 | B1 | 4/2002 | Stead |
| 6,389,467 | B1 | 5/2002 | Eyal |
| 6,407,750 | B1 | 6/2002 | Gioscia et al. |
| 6,434,680 | B2 | 8/2002 | Belknap et al. |
| 6,446,080 | B1 | 9/2002 | Van Ryzin et al. |
| 6,452,609 | B1 | 9/2002 | Katinsky et al. |
| 6,453,281 | B1 | 9/2002 | Walters et al. |
| 6,490,432 | B1 | 12/2002 | Wegener et al. |
| 6,493,758 | B1 | 12/2002 | McLain |
| 6,523,124 | B1 | 2/2003 | Lunsford et al. |
| 6,529,804 | B1 | 3/2003 | Draggon et al. |
| 6,563,769 | B1 | 5/2003 | Van Der Meulen |
| 6,587,403 | B1 | 7/2003 | Keller et al. |
| 6,587,404 | B1 | 7/2003 | Keller et al. |
| 6,621,768 | B1 | 9/2003 | Keller et al. |
| 6,636,873 | B1 | 10/2003 | Carini et al. |
| 6,664,981 | B2 | 12/2003 | Ashe et al. |
| 6,665,803 | B2 | 12/2003 | Lunsford et al. |
| 6,718,348 | B1 | 4/2004 | Novak et al. |
| 6,721,489 | B1 | 4/2004 | Benyamin et al. |
| 6,731,312 | B2 | 5/2004 | Robbin |
| 6,760,721 | B1 | 7/2004 | Chasen et al. |
| 6,763,345 | B1 | 7/2004 | Hempleman et al. |
| 6,779,019 | B1 | 8/2004 | Mousseau et al. |
| 6,785,542 | B1 | 8/2004 | Blight et al. |
| 6,794,566 | B2 | 9/2004 | Pachet |
| 6,801,964 | B1 | 10/2004 | Mahdavi |
| 6,874,037 | B1 | 3/2005 | Abram et al. |
| 6,928,433 | B2 | 8/2005 | Goodman et al. |
| 6,933,433 | B1 * | 8/2005 | Porteus et al. ............... 84/615 |
| 6,941,324 | B2 | 9/2005 | Plastina et al. |
| 6,978,127 | B1 | 12/2005 | Bulthuis et al. |
| 6,987,221 | B2 | 1/2006 | Platt |
| 7,022,905 | B1 * | 4/2006 | Hinman et al. ............... 84/609 |
| 7,031,931 | B1 * | 4/2006 | Meyers ...................... 705/10 |
| 7,043,477 | B2 | 5/2006 | Mercer et al. |
| 7,055,165 | B2 | 5/2006 | Connelly |
| 7,075,000 | B2 * | 7/2006 | Gang et al. .................. 84/600 |
| 7,111,009 | B1 | 9/2006 | Gupta et al. |
| 7,117,516 | B2 | 10/2006 | Khoo et al. |
| 7,126,770 | B1 | 10/2006 | Arai et al. |
| 7,166,791 | B2 * | 1/2007 | Robbin et al. ............. 84/477 R |
| 7,205,471 | B2 * | 4/2007 | Looney et al. ............... 84/615 |
| 7,209,633 | B1 | 4/2007 | Novak et al. |
| 7,228,298 | B1 | 6/2007 | Raines |
| 7,272,385 | B2 | 9/2007 | Mirouze et al. |
| 7,343,384 | B2 * | 3/2008 | Plastina et al. ........... 707/104.1 |
| 7,345,232 | B2 * | 3/2008 | Toivonen et al. ............. 84/615 |
| 7,502,626 | B1 | 3/2009 | Lemilainen |
| 2001/0004310 | A1 | 6/2001 | Kono |
| 2001/0011308 | A1 | 8/2001 | Clark et al. |
| 2001/0021053 | A1 | 9/2001 | Colbourne et al. |
| 2001/0041021 | A1 | 11/2001 | Boyle et al. |
| 2001/0044835 | A1 | 11/2001 | Schober et al. |
| 2001/0048642 | A1 | 12/2001 | Berhan |
| 2001/0052123 | A1 | 12/2001 | Kawai |
| 2002/0002413 | A1 | 1/2002 | Tokue |
| 2002/0010788 | A1 | 1/2002 | Nathan et al. |
| 2002/0013784 | A1 | 1/2002 | Swanson |
| 2002/0016968 | A1 | 2/2002 | Nathan et al. |
| 2002/0046315 | A1 | 4/2002 | Miller et al. |
| 2002/0055934 | A1 | 5/2002 | Lipscomb et al. |
| 2002/0073167 | A1 | 6/2002 | Powell et al. |
| 2002/0080180 | A1 | 6/2002 | Mander et al. |
| 2002/0116082 | A1 | 8/2002 | Gudorf |
| 2002/0118300 | A1 | 8/2002 | Middleton et al. |
| 2002/0133515 | A1 | 9/2002 | Kagle et al. |
| 2002/0138606 | A1 | 9/2002 | Robison |
| 2002/0152278 | A1 | 10/2002 | Pontenzone et al. |
| 2002/0161865 | A1 | 10/2002 | Nguyen |
| 2002/0174269 | A1 | 11/2002 | Spurgat et al. |
| 2002/0194195 | A1 | 12/2002 | Fenton et al. |
| 2002/0194309 | A1 | 12/2002 | Carter et al. |
| 2003/0013493 | A1 | 1/2003 | Irimajiri et al. |
| 2003/0014767 | A1 | 1/2003 | Stumphauzer |
| 2003/0030733 | A1 | 2/2003 | Seaman et al. |
| 2003/0037254 | A1 | 2/2003 | Fischer et al. |
| 2003/0046434 | A1 | 3/2003 | Flanagin et al. |
| 2003/0050058 | A1 | 3/2003 | Walsh et al. |
| 2003/0055723 | A1 | 3/2003 | English |
| 2003/0074457 | A1 | 4/2003 | Kluth |
| 2003/0079038 | A1 | 4/2003 | Robbin et al. |
| 2003/0093340 | A1 | 5/2003 | Krystek et al. |
| 2003/0098893 | A1 | 5/2003 | Makinen |
| 2003/0112279 | A1 | 6/2003 | Irimajiri |
| 2003/0149628 | A1 | 8/2003 | Abbosh et al. |
| 2003/0167318 | A1 | 9/2003 | Robbin et al. |
| 2003/0182315 | A1 | 9/2003 | Plastina et al. |
| 2003/0191756 | A1 | 10/2003 | Oh |
| 2003/0206203 | A1 | 11/2003 | Ly |
| 2003/0210821 | A1 | 11/2003 | Yogeshwar et al. |
| 2003/0221541 | A1 | 12/2003 | Platt |
| 2004/0001395 | A1 | 1/2004 | Keller et al. |
| 2004/0001396 | A1 | 1/2004 | Keller et al. |
| 2004/0017997 | A1 | 1/2004 | Cowgill |
| 2004/0027930 | A1 | 2/2004 | Kudo |
| 2004/0055446 | A1 | 3/2004 | Robbin et al. |
| 2004/0076086 | A1 | 4/2004 | Keller |
| 2004/0083480 | A1 | 4/2004 | Dodge |

| | | | |
|---|---|---|---|
| 2004/0093274 A1 | 5/2004 | Vanska et al. |
| 2004/0103102 A1 | 5/2004 | Nelson |
| 2004/0113915 A1 | 6/2004 | Ohtsuki et al. |
| 2004/0123725 A1 | 7/2004 | Kim |
| 2004/0128277 A1 | 7/2004 | Mander et al. |
| 2004/0139180 A1 | 7/2004 | White et al. |
| 2004/0148358 A1 | 7/2004 | Singh et al. |
| 2004/0205028 A1 | 10/2004 | Verosub et al. |
| 2004/0225762 A1 | 11/2004 | Poo |
| 2004/0261064 A1 | 12/2004 | Goldstein et al. |
| 2005/0055718 A1 | 3/2005 | Stone |
| 2005/0060264 A1 | 3/2005 | Schrock et al. |
| 2005/0080915 A1 | 4/2005 | Shoemaker |
| 2005/0149392 A1 | 7/2005 | Gold et al. |
| 2005/0235015 A1 | 10/2005 | Abanami et al. |
| 2005/0240494 A1 | 10/2005 | Cue et al. |
| 2005/0240661 A1 | 10/2005 | Heller et al. |
| 2005/0249080 A1 | 11/2005 | Foote et al. |
| 2005/0262528 A1 | 11/2005 | Herley |
| 2005/0267803 A1 | 12/2005 | Patel et al. |
| 2005/0278377 A1 | 12/2005 | Mirrashidi et al. |
| 2006/0015378 A1 | 1/2006 | Mirrishidi et al. |
| 2006/0036567 A1 | 2/2006 | Tan |
| 2006/0066627 A1 | 3/2006 | Gerhard et al. |
| 2006/0089949 A1 | 4/2006 | Robbin |
| 2006/0100978 A1 | 5/2006 | Heller et al. |
| 2006/0156236 A1 | 7/2006 | Heller et al. |
| 2006/0156239 A1 | 7/2006 | Jobs |
| 2006/0163358 A1 | 7/2006 | Biderman |
| 2006/0168340 A1 | 7/2006 | Heller et al. |
| 2006/0247980 A1 | 11/2006 | Mirrashidi et al. |
| 2008/0256378 A1 | 10/2008 | Guillorit |
| 2009/0063496 A1 | 3/2009 | Cunningham et al. |
| 2009/0063543 A1 | 3/2009 | Martin et al. |

FOREIGN PATENT DOCUMENTS

| | | |
|---|---|---|
| EP | 0 982 732 | 3/2000 |
| EP | 1 028 425 | 8/2000 |
| EP | 1 548 740 | 6/2005 |
| JP | 2000-339917 | 12/2000 |
| JP | 2001-76465 | 3/2001 |
| JP | 2001-93226 | 4/2001 |
| JP | 2001-117800 | 4/2001 |
| JP | 2001/291365 A | 10/2001 |
| JP | 2002/74909 A | 3/2002 |
| WO | WO 95/16950 | 6/1995 |
| WO | WO 01/33569 | 5/2001 |
| WO | WO 01/67753 | 9/2001 |
| WO | WO 02/25610 | 3/2002 |
| WO | WO 02/25935 | 3/2002 |
| WO | WO 03/023786 | 3/2003 |
| WO | WO 2004-004338 | 1/2004 |
| WO | 2005073856 A2 | 8/2005 |

OTHER PUBLICATIONS

"Replay Gain—A proposed Standard," Oct. 7, 2001, from http://replaygain.hydrogenaudio.org/index.html and http://replaygain.hydrogenaudio.org/outline.html.
Breen, Christopher, "iMixing it Up: Sharing Your Sounds," Sep. 17, 2004, http://playlistmag.com/help/2004/09/imixhowto/index.php.
Kawamoto et al., "On 1st Birthday, iTunes Unwraps New Features," Apr. 28, 2004, http://news.com.com/On+1st+birthday,+iTunes+unwraps+new+features/2100-1027_3-5201598.html.
U.S. Appl. No. 10/936,233, filed Sep. 7, 2004.
International Search Report dated Sep. 6, 2005 for corresponding PCT Application No. PCT/US2005/013647.
Glenn Fleishman, "Handheld iPod joins MP3 band a bit late, but is standout player," Nov. 6, 2001, http://seattletimes.nwsource.com/html/businesstechnology/134361811_ptmacc040.html.
"Hewlett Packard Jornada 525 Color Pocket PC," downloaded Jan. 25, 2002, http://www.pc4d.com/electronics/products/56/jornada_525_color_pocket_pc.shtml.
iTunes, Digital Music for your Mac, Apple Computer, Inc., downloaded Oct. 22, 2001, http://www.apple.com/itunes/.
"Rio Portable Music Player," Web Review, downloaded Jan. 25, 2002, http://www.webreviews.com/9901/rio.html.
Andy Lindauer, "What's in your Pocket?," Edgereview, downloaded Jan. 25, 2002, http://www.edgereview.com/print.cfm?Type=aag&ID=286.
International Search Report and Written Opinion for corresponding PCT application No. PCT/US2005/013647 dated Jan. 16, 2006.
De Herrera, Chris, "Microsoft ActiveSync 3.1," Version 1.02, Oct. 13, 2000.
IEEE 1394—Wikipedia, 1995, http://www.wikipedia.org/wiki/Firewire.
Miniman, "Applian Software's Replay Radio and Player v1.02," Product review, pocketnow.com, http://www.pocketnow.com/reviews/replay/replay.htm, Jul. 31, 2001.
Personal Jukebox (PJB), "Systems Research Center and PAAD," Compaq Computer Corp., Oct. 13, 2000, http://research.compaq.com/SRC/pjb/.
Compaq, "Personal Jukebox," Jan. 24, 2001, http://research.compaq.com/SRC/pjb/.
Steinberg, "Sonicblue Rio Car," Product Review, Dec. 12, 2000, http://electronics.cnet.com/electronics/0-6342420-1304-4098389.html.
Andrew Birrell, "Personal Jukebox (PJB)," Oct. 13, 2000, http://birrell.org/andrew/talks/pjb-overview.ppt.
Travis Butler, "Portable MP3: The Nomad Jukebox," Jan. 8, 2001, http://db.tidbits.com/getbits.acgi?tbart=06261.
Travis Butler, "Archos Jukebox 6000 Challenges Nomad Jukebox," Aug. 13, 2001, http://db.tidbits.com/getbits.acgi?tbart=06521.
Adam C. Engst, "SoundJam Keeps on Jammin'," Jun. 19, 2000, http://db.tidbits.com/getbits.acgi?tbart=05988.
Musicmatch, "Musicmatch and Xing Technology Introduce Musicmatch Jukebox," May 18, 1998, http://www.musicmatch.com/info/company/press/releases/?year=1998&release=2.
"Nomad Jukebox," User Guide, Creative Technology Ltd., Version 1, Aug. 2000.
"Apple's iPod Available in Stores Tomorrow," Press Release, Apple Computer, Inc., Nov. 9, 2001.
"Apple Introduces iTunes—World's Best and Easiest To Use Jukebox Software," Macworld Expo, San Francisco, Jan. 9, 2001.
iTunes, Playlist Related Help Screens, iTunes v1.0, Apple Computer, Inc., Jan. 2001.
"Apple Announces iTunes 2," Press Release, Apple Computer, Inc., Oct. 23, 2001.
Specification Sheet, iTunes 2, Apple Computer, Inc., Oct. 31, 2001.
iTunes 2, Playlist Related Help Screens, iTunes v2.0, Apple Computer, Inc., Oct. 23, 2001.
SoundJam MP Plus, Representative Screens, published by Casady & Greene, Inc., Salinas, CA, 2000.
"SoundJam MP Plus Manual, version 2.0"—MP3 Player and Encoder for Macintosh by Jeffrey Robbin, Bill Kincaid and Dave Heller, manual by Tom Negrino, published by Casady & Greene, Inc., 2000.
"Digital Still Cameras—Downloading Images to a Computer," Mimi Chakarova et al., Multi-Media Reporting and Convergence, 2 pgs.
U.S. Appl. No. 10/198,639, filed Jul. 16, 2002.
U.S. Appl. No. 10/833,879, filed Apr. 27, 2004.
U.S. Appl. No. 10/973,925, filed Oct. 25, 2004.
U.S. Appl. No. 11/097,591, filed Apr. 1, 2005.
U.S. Appl. No. 11/097,034, filed Apr. 1, 2005.
International Search Report dated Jul. 9, 2003, from International Application No. PCT/US03/21534.
"About MusicMatch Jukebox," MusicMatch Jukebox v4 Help, 1999, pp. 1-4.
Bridgman, "Windows XP Expert Zone Community Columist", Using Windows Mobil-based Portable Media Centers and Windows Media Player 10, Aug. 25, 2004, 1-11.
Compaq Computer Corp., copyright 1991, Personal Jukebox User Manual, pp. 1-29.

Handbook for Palm™ m500 Series Handhelds, User Manual, copyright 1998-2001.
Lyra, Personal Digital Player, RCA, Product Box, (2003).
RCA Lyra User's Guide, RD2201/2202/2204, www.lyrazone.com, (1999) pp. 1-37.
RealJukebox Plus Manual, Real Networks, Inc., copyright 1999, pp. 1-83.
RealJukebox, Real Networks, Inc., webpages downloaded Oct. 27, 2005 http://www.real.com/Jukebox/release_notes.html#.
Sinitsyn, "A Synchronization Framework for Personal Mobile Servers," Proceedings of the Second IEEE Annual Conference on Pervasive Computing and Communications Workshops, Piscataway, NJ, Mar. 14, 2004, pp. 1-4.
TuneBase 100 User Guide, A CD Library Management System, Escient, Inc. copyright 1999.
TuneBase Pro Mk-II User's Guide, Escient, Inc. (1999).
Vetro et al., "Media Conversions to Support Mobile Users," IEEE Canadian Conference on Electrical and Computer Engineering, Piscataway, NJ, May 13, 2001, pp. 607-612.
Window's Media Player 6.4, Microsoft Corp., copyright 1999, software available at http://www.oldversion.com/program.php?n=wmp See also Windows Media Player 6.4 Software Official website at http://www.microsoft.com/windows/windowsmedia/player/version64/default.aspx.
Zheng et al., "MobiGATE: a mobile gateway proxy for the active deployment of transport entities," Proceedings of the 2004 International Conference on Parallel Processing, Piscataway, NJ, Aug. 15, 2004.
PBS Local Insertion Server Instruction Manual, Microvision, Inc., pp. 1-71, Jun. 19, 1996.
Wave Station Digital Audio Automation System, Instruction & Operations Manual Broadcast Software International, pp. 1-113, Feb. 4, 1997.
Nielsen et al., "Comparative Design Review: An Exercise in Parallel Design", Interchi '93, pp. 414-417 Apr. 24-29, 1993.
Lowery Daryl, "Random-Access Digital Audio—Recording Systems", pp. 68-71, Jun. 1992.
Sadie Master System, Product Brochure, Studio audio Digital Equipment Inc., 2 pgs., Jan. 1995.
RCS Works—Cart Wall User's Guide and Reference Manual, pp. 1-83, Feb. 7, 1993.
"Digital Audio Just Got Easier!", CartWorks Digital Audio Systems, dbm Systems, Inc., Jun. 26, 1996.
"CartWorks File Utilities User's Manual", dbm Systems, Inc., pp. 1-8., Jul. 1998.
"CartWorks MHD Music-on-Hard-Drive QuickSchedule User's Manual", dbm Systems, Inc., pp. 1-8, Feb. 8, 1998.
"CartWorks MHD Music-on-Hard-Drive User's Manual V6.8", dbm Systems, Inc., pp. 1-11, Feb. 1998.
"CartWorks On-Demand Editor User's Manual", dbm Systems, Inc., pp. 1-7., Feb. 1998.
"CartWorks Script Editor User's Manual v3.12", dbm Systems, Inc., pp. 1-26., Feb. 1998.
"CartWorks Spot Set Editor User's Manual", dbm Systems, Inc., pp. 1-11., Feb. 1998.
"The DADpro Digital Audio Delivery System Operation Manual Version 1.0", IBM Corp., pp. 1-424, Aug. 30, 1996.
"Virtual Recorder—Basic Operations", ASC Audio Video Corporation, pp. 1-94, Sep. 9, 1996.
"Broadcast Tools: SpotBase, Playlist & TapeBase", ASC Audio Video Corporation, pp. 1-2., Mar. 1998.
"VR 300 Advanced Broadcast Video Server", ASC Audio Video Corporation, pp. 1-9., Mar. 1998.
"VR300 Video Server User Manual, Version 1.0", ASC Audio Video Corporation, pp. 1-40, Mar. 20, 1998.
"Gravis WinDecks Version 1.12", screen shots, Gravis Computer Technology Ltd., pp. 1-10., Jan. 1990.
WinDecks, User Instructions, Gravis Computer Technology Ltd., pp. 1-14., Jan. 1990.
Iriver, "PMP140/120", Sep. 13, 2004, 1-2 pgs.
MG-25, Portable MPEG4 Player (MG-25), Jul. 29, 2004, 1-3 pgs.
Windows XP Service Pack 2, Figures 1-2 and "How to obtain the latest Windows XP service pack," Aug. 25, 2004.
Half-life—Wikipedia, the free encyclopedia, http://enwikipedia.org/wiki/Halfe-life.
Mabini. MemMaid Review. Pocket PC Dubai, Jul. 23, 2004[online], [retrieved on Mar. 26, 2008]. Retrieved from the Internew <URL: http://www.pocketpcdubai.com/DinarSoft/memmaid_review.html>.
Torrone, Phillip, How-To: Getting Podcasts on a Portable Media Center (and other Windows Media Devices, Oct. 2004.
Personal Jukebox (PJB), "System Research Center and PAAD", Compaq Computer Corp., Oct. 13, 2000, http://research.compaq.com/SRC/pjb/.
Etchison, "Accelerated Discrete Adjustment of the Parameters of a Process", IBM Technical Disclosure Bulletin, vol. 15, No. 5, Oct. 1, 1972, 2 pgs.
Communication pursuant to Article 94(3) EPC for European Patent Application No. 05737666.7, dated Jun. 18, 2010.

* cited by examiner

METHOD AND SYSTEM FOR CONFIGURABLE AUTOMATIC MEDIA SELECTION

CROSS-REFERENCE TO RELATED APPLICATION

This application is related to commonly owned U.S. patent application Ser. No. 10/198,639, filed Jul. 16, 2002, and entitled "METHOD AND SYSTEM FOR UPDATING PLAYLISTS," which is hereby incorporated by reference herein.

BACKGROUND OF THE INVENTION

1. Field of the Invention

The present invention relates to media systems and, more particularly, to media systems that support digital media.

2. Description of the Related Art

Media systems have permitted users to create playlists of audio tracks (i.e., songs) that are to be played. Typically, the media systems store a large library of audio tracks. Hence, the ability for a user to create their own playlists assists the user in playing those of the audio tracks from the library they prefer. Conventionally, playlists have been created either by a drag-and-drop operation or by user-specified rules. Once created, the audio tracks in the playlist can be successively played. After all the audio tracks in the playlist have been played, the playing of the playlist can be repeated. However, when requested or before repeating, the order in which the audio tracks are played can be altered, such as by a shuffle operation which randomly reorders the audio tracks within the playlist.

Unfortunately, there is no ability to use selection criteria when choosing a next audio track to be played from a source of a plurality of audio tracks. In the case of playlists, the audio tracks within a playlist are known in advance and played in accordance with their order. Thus, there is a need for improved techniques to play audio tracks in a more randomized fashion while considering selection criteria.

SUMMARY OF THE INVENTION

The invention pertains to techniques for repeatedly selecting and presenting media items at a media device. In one embodiment, media items are automatically (or dynamically) selected from a media source (e.g., list of media items) and then presented at a media device. As a result, the selected media items can be continuously selected and presented in an automated manner. In one embodiment, the automatic selection of the media items can be performed in accordance with at least one criterion. The at least one criterion can be user-specified and/or rules-based. In one implementation, the selection of the media items from the media source is random, but the at least one criterion can alter the probability that media items satisfying the at least one criterion are selected. Further, a display screen can display information pertaining to recently presented media items, media items being presented, and upcoming media items to be presented.

The invention can be implemented in numerous ways, including as a method, system, device, apparatus, graphical user interface, and computer readable medium. Several embodiments of the invention are discussed below.

As a method for playing media items on a media player, one embodiment of the invention includes the acts of: identifying a source for media items available to be played; identifying at least one criterion for use in selection of media items from the source; determining the media items to be played from the source based on the at least one criterion; and playing the determined media items on the media player.

As an automatic media presentation method for presenting media items on a media device, one embodiment of the invention includes at least the acts of: identifying a source for media items available to be played; determining a media item from the source based on at least one criterion; presenting the determined media item on the media device; and repeating the determining and presenting so as to automatically and continuously present media items on the media device.

As a graphical user interface for a media player, one embodiment of the invention includes at least a media source indication that visibly indicates a media source, and a list of information. The list of information within the graphical user interface pertains to at least a media item being played by the media player, a plurality of recently played media items, and a plurality of upcoming media items to be played.

As a computer readable medium including at least computer program code for presenting media items on a media device, one embodiment of the invention includes at least: computer program code for identifying a source for media items available to be played; computer program code for determining a media item from the source based on at least one criterion; computer program code for presenting the determined media item on the media device; and computer program code for repeating the computer program code for determining and the computer program code for presenting so as to automatically and continuously present media items on the media device.

As a method of automatically selecting media items from a source library for presentation using a media player, one embodiment of the invention includes the acts of: receiving a user selection of at least one criterion to be used in selecting media items from the library; determining a media item for presentation using the at least one criterion; and presenting the determined media item using the media player.

As a method of configuring criteria for selecting media items to be presented using a media player, one embodiment of the invention includes the acts of: receiving a user selection of at least one criterion to be used for selecting media items from a source library; receiving a user selection of a range of values for said at least one criterion; determining a media item for presentation using the at least one criterion and the range of values; and presenting the determined media item using the media player.

As a method of configuring criteria for selecting media items to be presented using a media player, one embodiment of the invention includes the acts of: receiving at least one user-configured rule to be used for selecting media items from a source of media items; determining a media item for presentation using the at least one user-configured rule; and presenting the determined media item using the media player.

As a computer readable medium including at least computer program code for selecting media items to be presented on a media device, one embodiment of the invention includes at least: computer program code for providing a random play mode for the media device; computer program code for configuring the random play mode to influence selection of particular media items to be presented by the media device; and computer program code for operating the media device is the configured random play mode wherein the media items to be played on the media device are randomly chosen in accordance with a configuration of the configured random play mode.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to techniques for repeatedly selecting and presenting media items at a media device. In one embodiment, media items are automatically (or dynamically) selected from a media source (e.g., list of media items) and then presented at a media device. As a result, the selected media items can be continuously selected and presented in an automated manner. In one embodiment, the automatic selection of the media items can be performed in accordance with at least one criterion. The at least one criterion can be user-specified and/or rules-based. In one implementation, the selection of the media items from the media source is random, but the at least one criterion can alter (e.g., increase or decrease) the probability that media items satisfying the at least one criterion are selected. Further, a display screen can display information pertaining to recently presented media items, media items being presented, and upcoming media items to be presented.

The media device is a device that can present (e.g., play or display) media items. For example, the media device can be a media player, which can play media items. Examples of media devices include a personal computer, a personal digital assistant and portable media player. One example of a portable media player is an iPod™ media player available from Apple Computer, Inc. of Cupertino, Calif.

Embodiments of the invention are discussed below with reference to FIGS. 1-9B. However, those skilled in the art will readily appreciate that the detailed description given herein with respect to these figures is for explanatory purposes as the invention extends beyond these limited embodiments.

Figure 1:
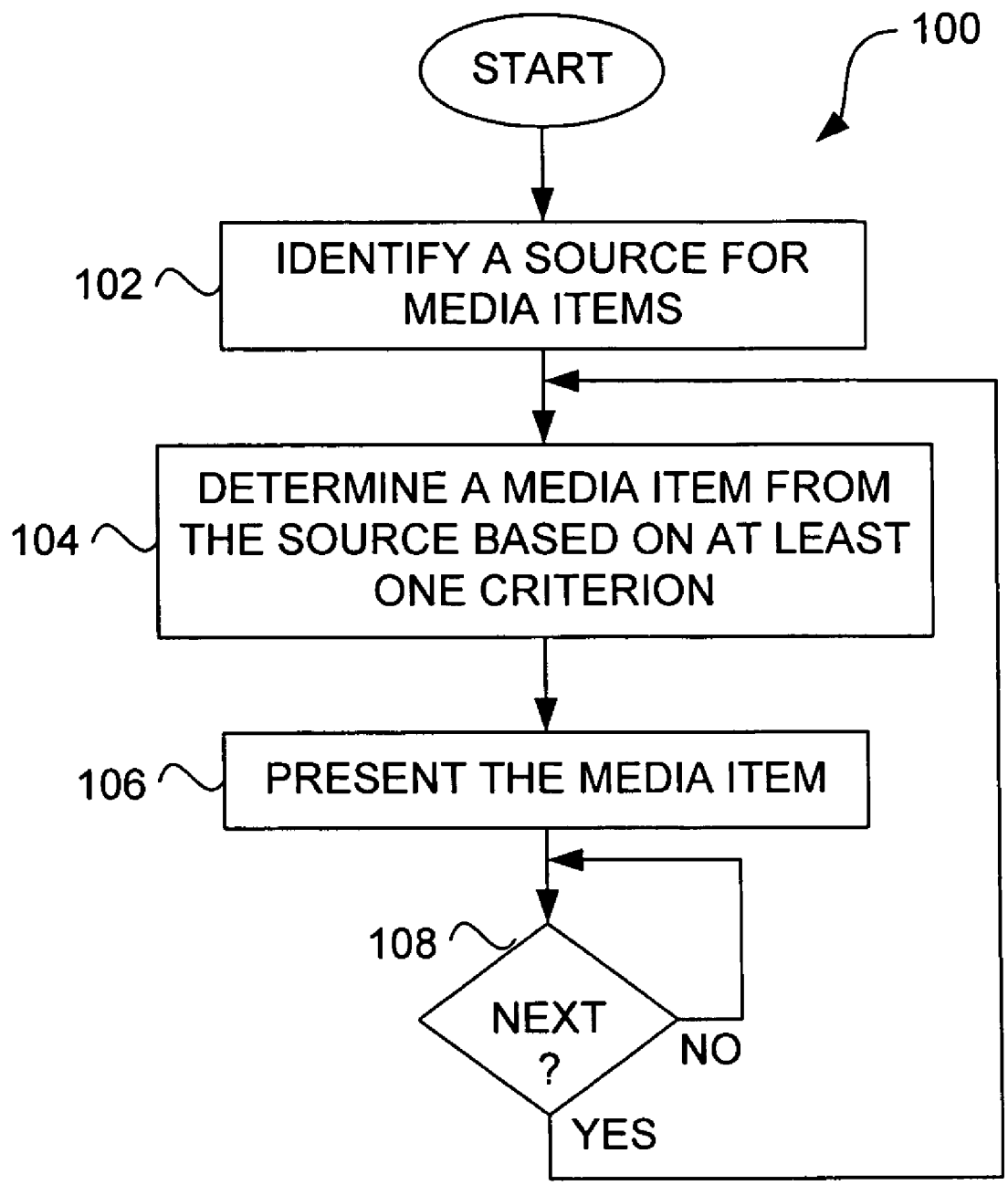
FIG. 1 is a flow diagram of an automatic media presentation process according to one embodiment of the invention.

FIG. 1 is a flow diagram of an automatic media presentation process 100 according to one embodiment of the invention. The automatic media presentation process 100 is, for example, performed by a media device that is capable of presenting a media item. The automatic media presentation process 100 initially identifies 102 a source for media items. The identification of a source can be as a result of a user selection of one of multiple possible sources, or a result of a configuration of the media device to select media items from a certain source. Next, a media item from the source is determined 104 based on at least one criterion. For example, the criterion can be predetermined or user-provided. Then, the media item is presented 106. Typically, the media item would be presented 106 to a user of a machine that performs the automatic media presentation process 100. For example, the media item can be presented by playing the media item or displaying the media item, or both. Thereafter, since the presentation 106 is typically over a period of time (e.g., several seconds to several minutes), a decision 108 determines whether the automatic media presentation process 100 should proceed to the next media item. In other words, the decision 108 determines whether the media item has been presented 106 for a sufficient duration such that a next media item should be acquired and presented. When the decision 108 determines that the next media item is not yet to be presented, the automatic media presentation process 100 awaits until the next media item is to be presented. Typically, during such waiting at the decision 108, the current media item is still being presented 106. On the other hand, when the decision 108 determines that the next media item should be presented, the automatic media presentation process 100 returns to repeat the operation 104 and subsequent operations so that the next media item can be likewise determined and presented. In this manner, the automatic media presentation process 100 selects subsequent media items to be determined and presented in an automatic manner. As a result, media items can be continuously presented without additional user interaction.

Figure 2A:
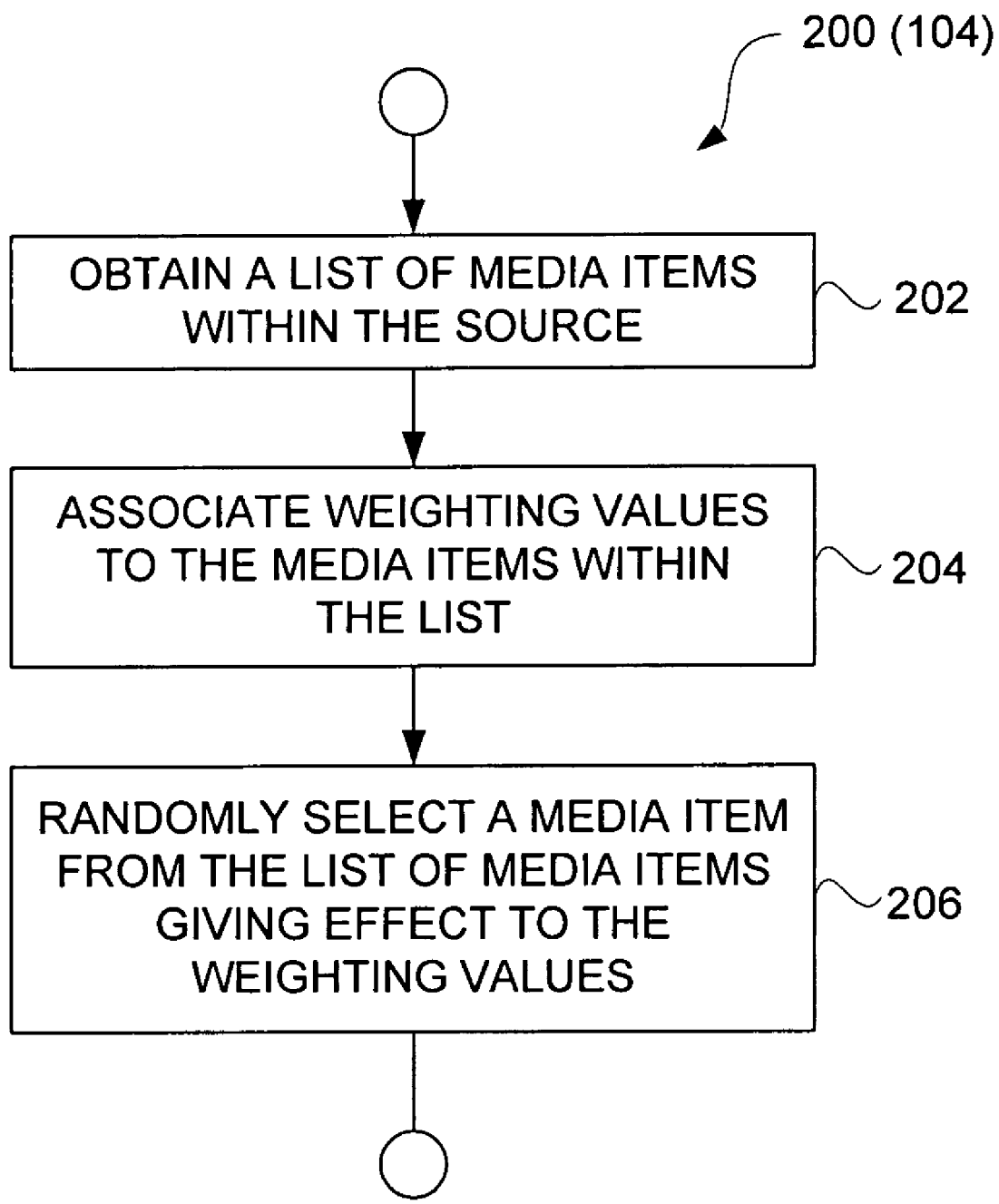
FIG. 2A is a flow diagram of a media determination process according to one embodiment of the invention.

FIG. 2A is a flow diagram of a media determination process 200 according to one embodiment of the invention. The media determination process 200 is, for example, processing that can be performed when the automatic media presentation process 100 shown in FIG. 1 determines 104 a media item from a source based on at least one criterion.

The media determination process 200 obtains 202 a list of media items within the source. Weighting values can be associated 204 with the media items within the list. As an example, the weighting values can be based on system-provided ratings or user-provided ratings applied to the media items. For example, in one implementation, the weighting values can be numerical values from one (1) to five (5), with one (1) being the lowest rating and five (5) being the highest rating. Next, a media item is randomly selected 206 from the list of media items giving effect to the weighting values. Here, although the selection is random, those of the media items being associated with greater weighting values are more likely to be selected.

Figure 2B:
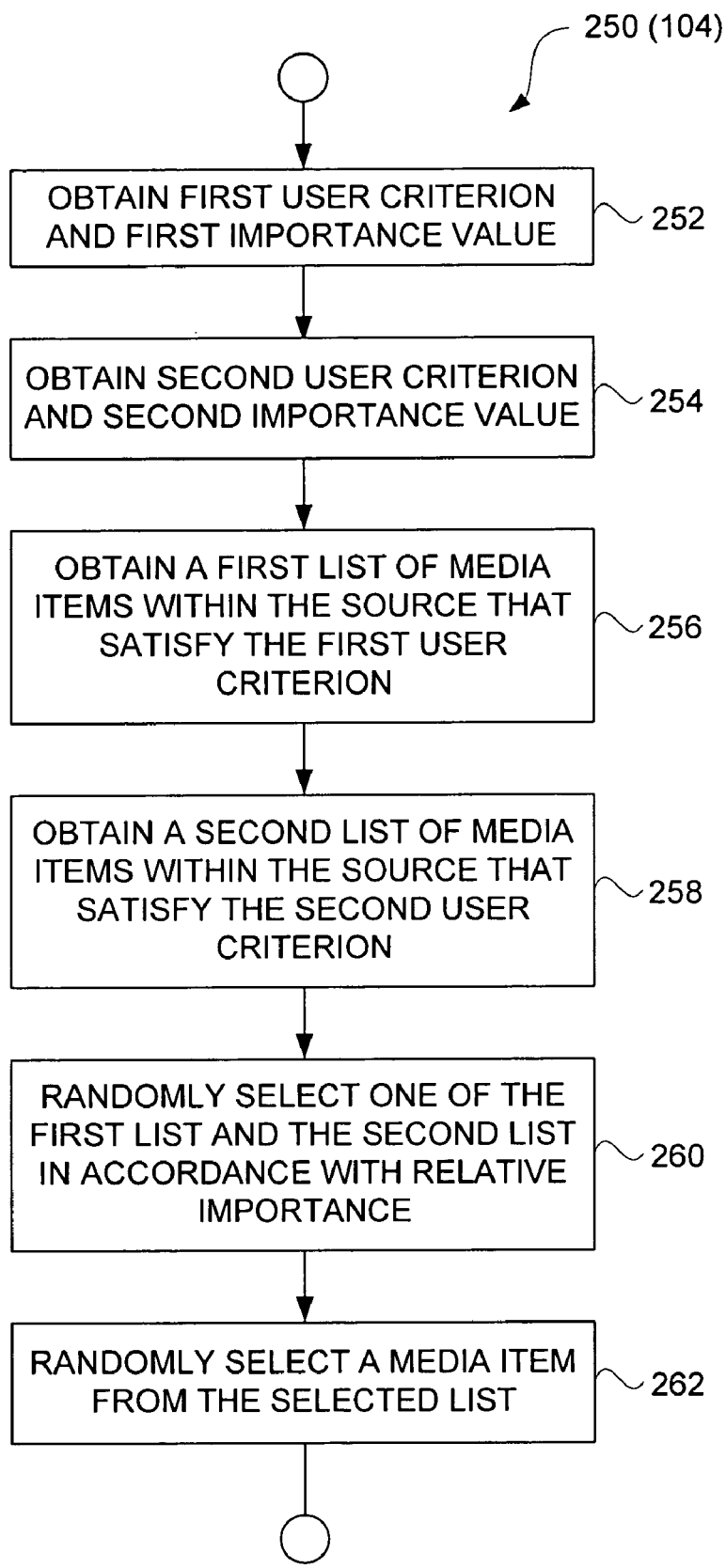
FIG. 2B is a flow diagram of a media determination process according to another embodiment of the invention.

FIG. 2B is a flow diagram of a media determination process 250 according to another embodiment of the invention. The media determination process 250 is, for example, processing that can be performed when the automatic media presentation process 100 shown in FIG. 1 determines 104 a media item from a source based on at least one criterion.

The media determination process 250 initially obtains 252 a first user criterion and a first importance value. In addition, a second user criterion and a second importance value are obtained 254. The first user criterion and the second user criterion can be user-provided or can be default criteria. The first importance value signifies the importance of those media items that satisfy the first user criterion. Similarly, the second importance value signifies the importance of those media items that satisfy the second user criterion. The importance values can be considered part of the criteria. In one embodiment, the importance values can be weighting factors.

Then, a first list of media items within the source that satisfy the first user criterion are obtained 256. In addition, a second list of media items within the source that satisfy the second user criterion are obtained 258. Next, one of the first list and the second list are randomly selected 260 in accordance with their relative importance. The relative importance can, for example, be determined from the first importance value and the second importance value. In one example, the first importance value and the second importance value are percentages that together add up to 100%. For example, if the first importance value is 75%, the second importance value would be 25%, and the random selection 260 would, on average, select the first list 75% of the time and select the second list 25% of the time.

Subsequently, the media determination process 250 randomly selects 262 a media item from the selected list. That is, once one of the first list and the second list have been randomly selected 260 in accordance with their relative importance, a media item is randomly selected 262 from the selected list. For example, if the first list were randomly selected at operation 260, then one of the media items within the first list would be randomly selected at operation 262.

Figure 3:
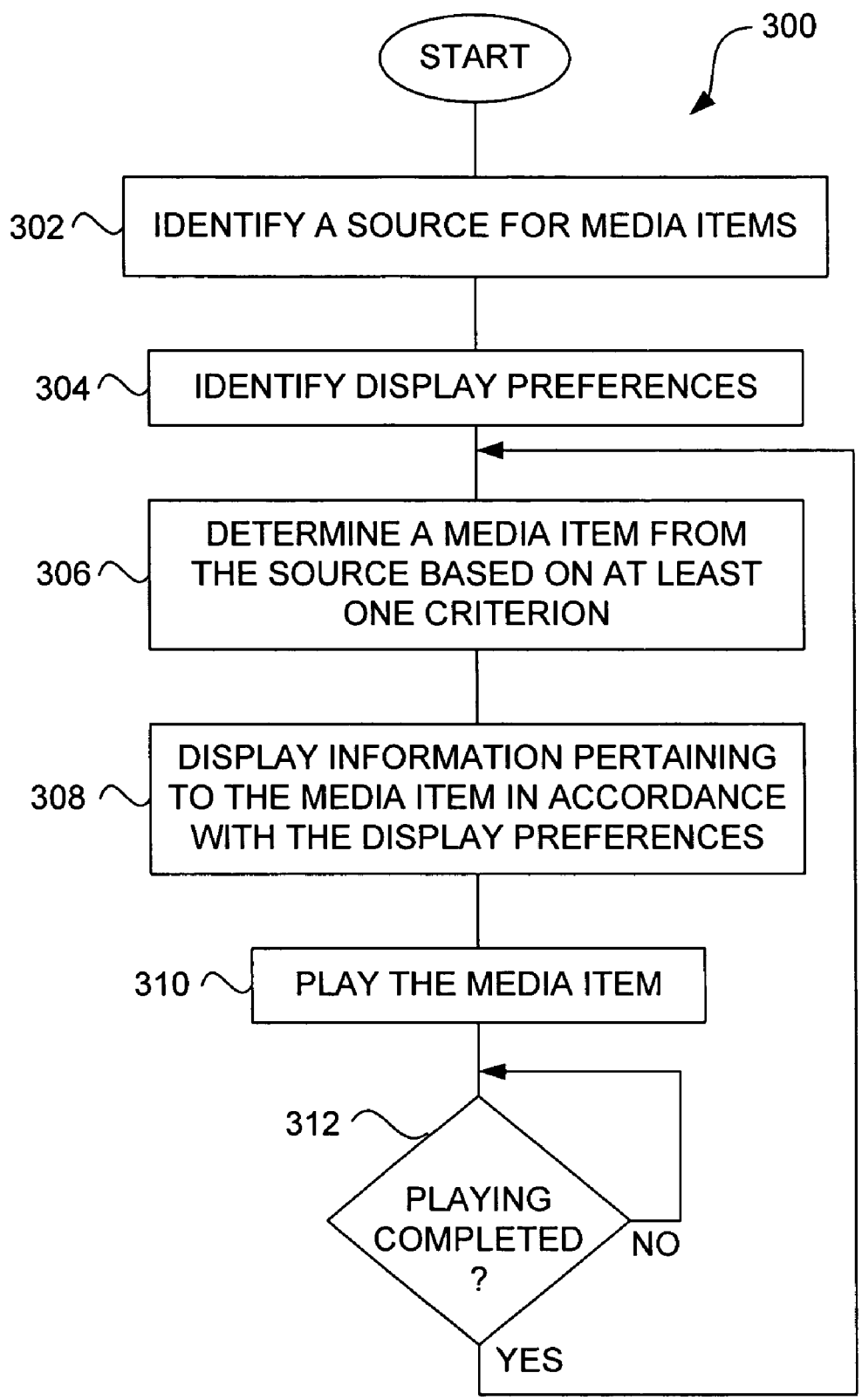
FIG. 3 is a flow diagram of an automatic media presentation process according to one embodiment of the invention.

FIG. 3 is a flow diagram of an automatic media presentation process 300 according to one embodiment of the invention. The automatic media presentation process 300 is, for example, performed by a media player that is capable of playing a media item.

The automatic media presentation process 300 initially identifies 302 a source for media items. In addition, the automatic media presentation process 300 identifies 304 display preferences. The display preferences can pertain to user-specified or default preferences that control the manner in which media items are displayed 304 by the media player. For example, the display preferences could specify a number of upcoming songs to be displayed in advance as well as a number of recently played songs in the past.

Next, a media item is determined 306 from the source based on at least one criterion. For example, the criterion can be predetermined or user-provided. Typically, the media item would be selected from the source in a random manner. However, when at least one criterion is utilized, the selection of the media item is biased in accordance with the criterion, although the particular media item being selected is still premised on a random selection.

After the media item has been determined 306, information pertaining to the media item can be displayed 308 on the media player in accordance with the display preferences. Typically, the information pertaining to the media item is descriptive information concerning the media item, such as attributes of the media item. For example, information pertaining to the media item might be displayed in a visually distinct manner, and may also be presented in a context of a list of media items that additionally contain recently played media items as well as upcoming media items to be played. The automatic media presentation process 300 also plays 310 the media item at the media player.

A decision 312 then determines whether the playing of the media item has completed. When the decision 312 determines that the playing of the media item has not yet completed, the automatic media presentation process 300 awaits its completion. Once the decision 312 determines that the playing of the media item has completed, then the automatic media presentation process 300 can return to repeat the block 306 and subsequent blocks so that additional media items can be likewise determined, displayed and played. In this manner, the automatic media presentation process 300 automatically selects subsequent media items to be displayed and played. As a result, media items can be continuously displayed and played without additional user interaction. In one embodiment, the selection of subsequent media items can insure that a given song does not repeat (i.e., the same song is not played back-to-back).

Figure 4A:
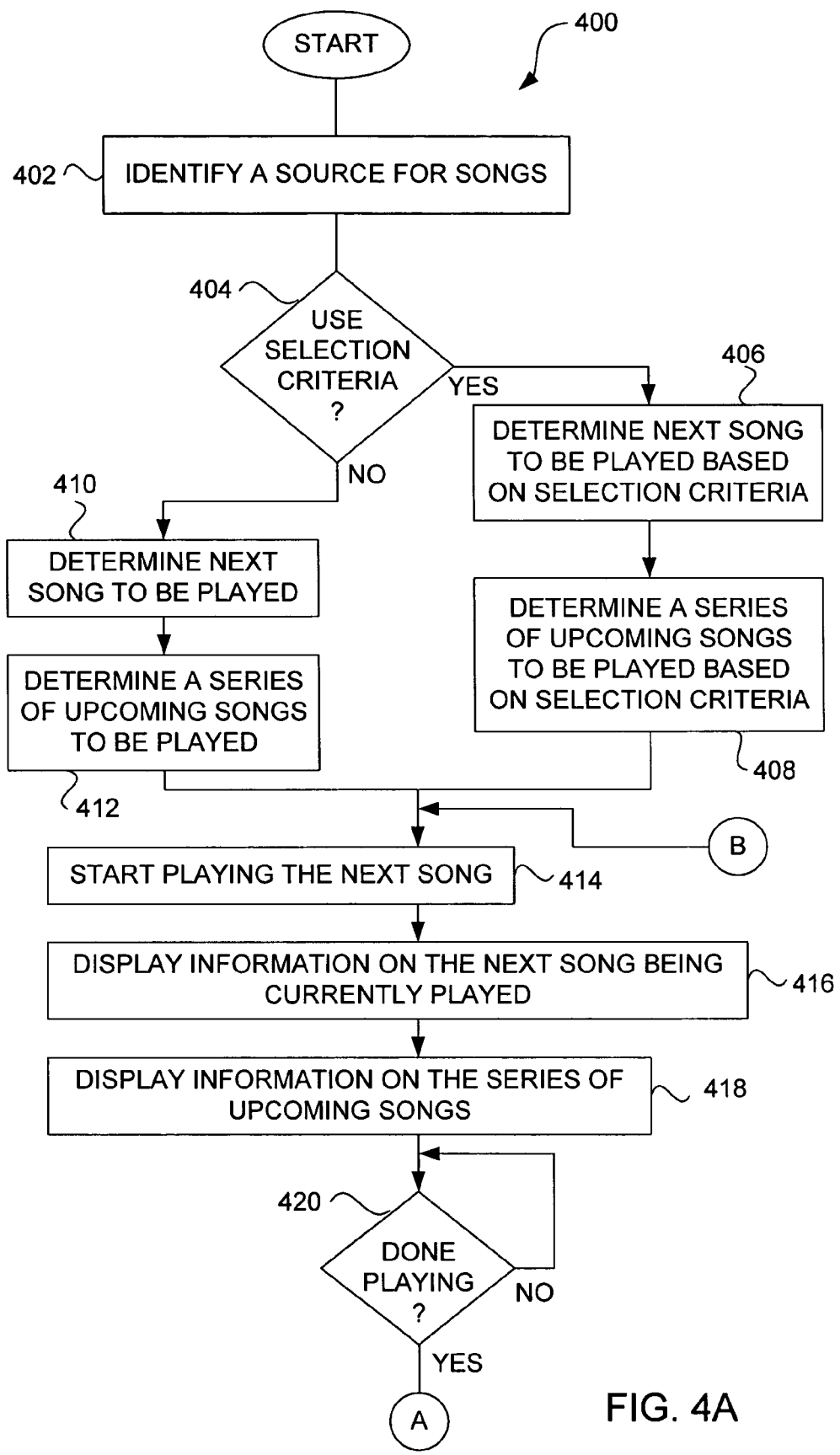
FIGS. 4A and 4B are flow diagrams of an automatic media presentation process according to another embodiment of the invention.
Figure 4B:
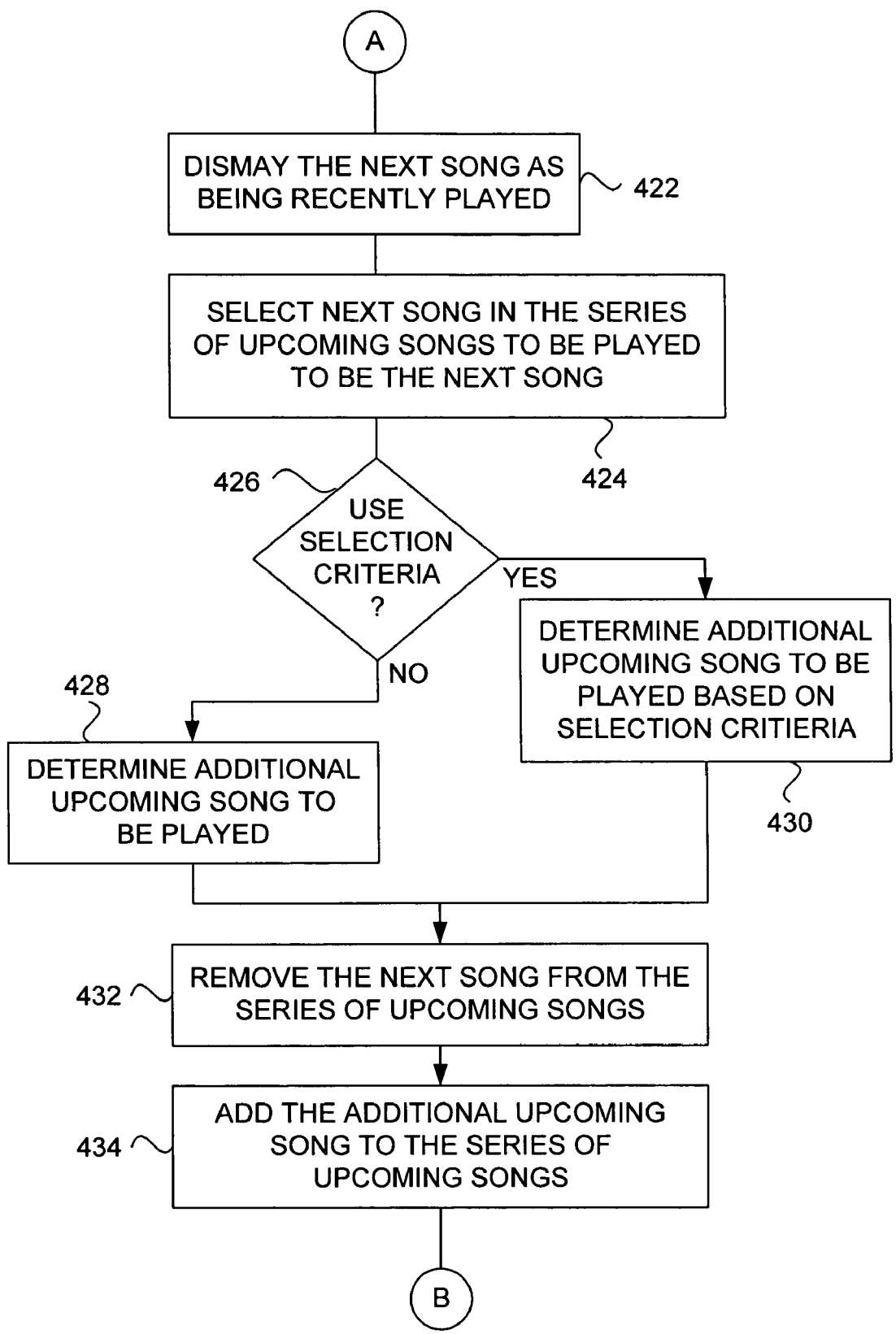

FIGS. 4A and 4B are flow diagrams of an automatic media presentation process 400 according to another embodiment of the invention. The automatic media presentation process 400 can, for example, be performed on a media player.

The automatic media presentation process 400 identifies 402 a source for songs. The source includes a plurality of songs. For example, the source can be a library or a playlist. A decision 404 then determines whether selection criteria is to be utilized when selecting songs to be played.

When the decision 404 determines that selection criteria is to be used, then a next song to be played is determined 406 based on the selection criteria. In one embodiment, although the determination 406 of the next song remains substantially random, the determination is biased in accordance with the selection criteria. After the next song to be played has been determined 406, a series of upcoming songs to be played can be determined 408 based on the selection criteria. Here, the series of upcoming songs are determined in advance of their being played such that they are available to be viewed on a display in advance of their play time, as discussed in more detail below.

On the other hand, when the decision 404 determines that selection criteria is not to be utilized, then a next song to be played is determined 410. Here, the determination 410 of the next song is achieved in a random manner. In addition, a series of upcoming songs to be played are also determined 412 in a random manner. Again, the series of upcoming songs are determined in advance of their being played such that they are available to be viewed on the display in advance of their play time.

Following the blocks 408 or 412, the automatic media presentation process 400 starts 414 playing the next song. Here, the media player that is performing the automatic media presentation process 400 operates to play the next song for the benefit of its user. In addition, information pertaining to the next song being currently played can be displayed 416. Still further, information pertaining to the series of upcoming songs can also be displayed 418. In this embodiment, the media items are songs; hence, the information being displayed 416 and 418 might indicate the song name, artist, album, genre, duration, or other attributes for such songs.

Next, a decision 420 determines whether the next song being played is done playing. When the decision 420 determines that the next song being played is not yet done, the automatic media presentation process 400 awaits its completion. On the other hand, when the decision 420 determines that the next song is done being played, the next song is displayed 422 as having been recently played. Then, a next song in the series of upcoming songs to be played is selected 424 to be the next song. A decision 426 then determines whether selection criteria is to be utilized in selecting the songs to be played. When the decision 426 determines that selection criteria is not to be utilized, an additional upcoming song to be played is determined 428. On the other hand, when the decision 426 determines that selection criteria is to be utilized, an additional upcoming song to be played is determined 430 based on the selection criteria. Here, as in operation 408, the determination 430 of the additional upcoming song to be played is done in a random manner, though biased by the selection criteria.

Following the blocks 428 and 430, the next song is removed 432 from the series of upcoming songs. The additional upcoming song is added 434 to the series of upcoming songs. In effect, the blocks 432 and 434 operate to update the series of upcoming songs to remove the next song that is going to be played and to add an additional upcoming song, such that the series of upcoming songs is updated to remove its oldest upcoming song and to add a new upcoming song. Following the block 434, the automatic media presentation process 400 returns to repeat the block 414 and subsequent blocks so that the next song is able to be played and so that the display of information pertaining to the various songs can be updated.

In one embodiment, the media player is a portable computing device dedicated to processing media such as audio, video or images. For example, the media player 102 can be a music player (e.g., MP3 player), a game player, a video player, a video recorder, a camera, an image viewer, and the like. These devices are generally battery-operated and highly portable so as to allow a user to listen to music, play games or video, record video or take pictures wherever the user travels. In one implementation, the media player is a hand-held device that is sized for placement into a pocket or hand of the user. By being hand-held, the media player is relatively small and easily handled and utilized by its user. By being pocket-sized, the user does not have to directly carry the device and therefore the device can be taken almost anywhere the user travels (e.g., the user is not limited by carrying a large, bulky and often heavy device, as in a portable computer). Furthermore, the device may be operated by the user's hands, no reference surface such as a desktop is needed.

Figure 5:
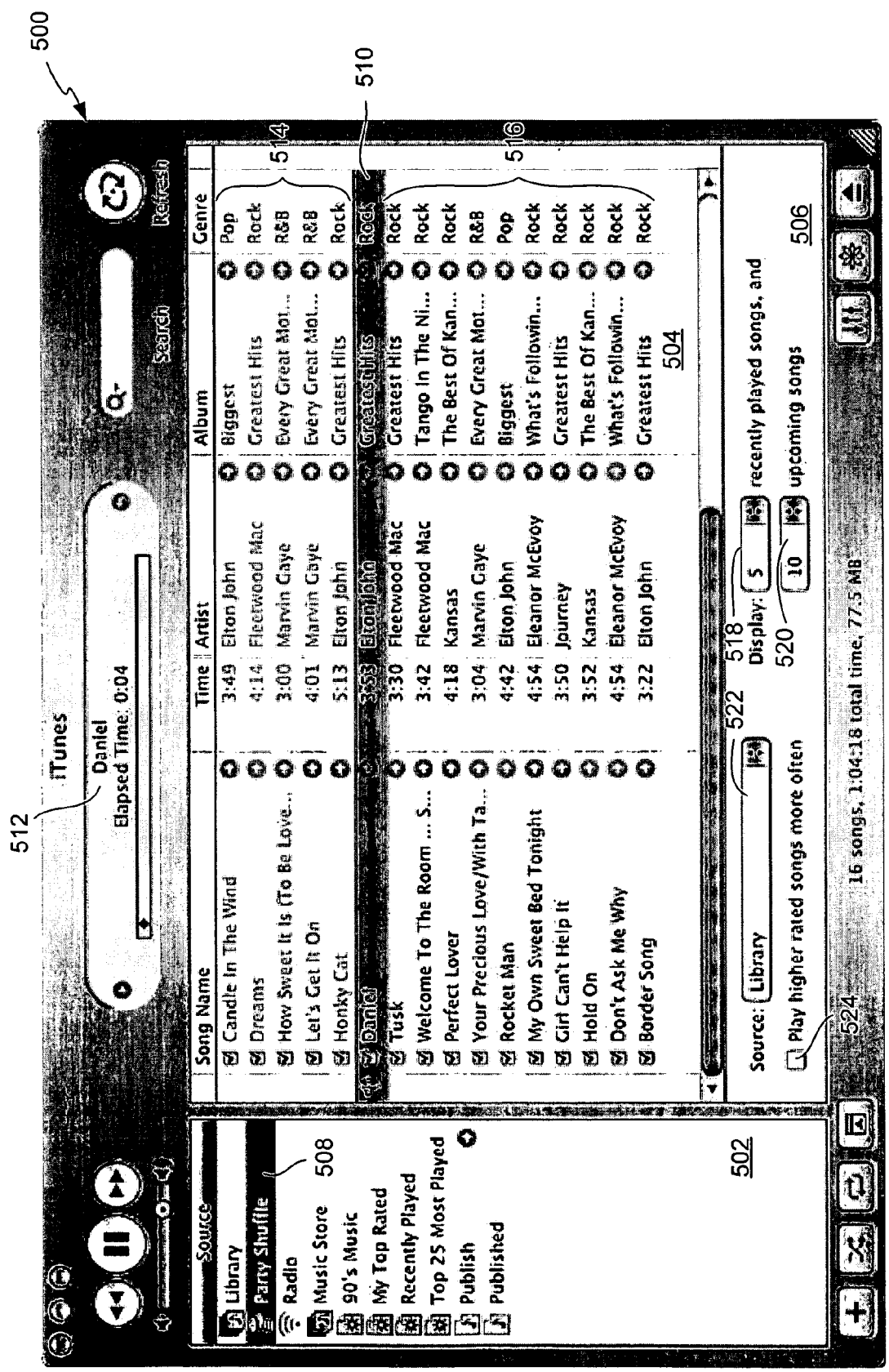
FIGS. 5 and 6 are screen shots of exemplary graphical user interfaces for automated media selection and presentation according to one embodiment of the invention.
Figure 6:
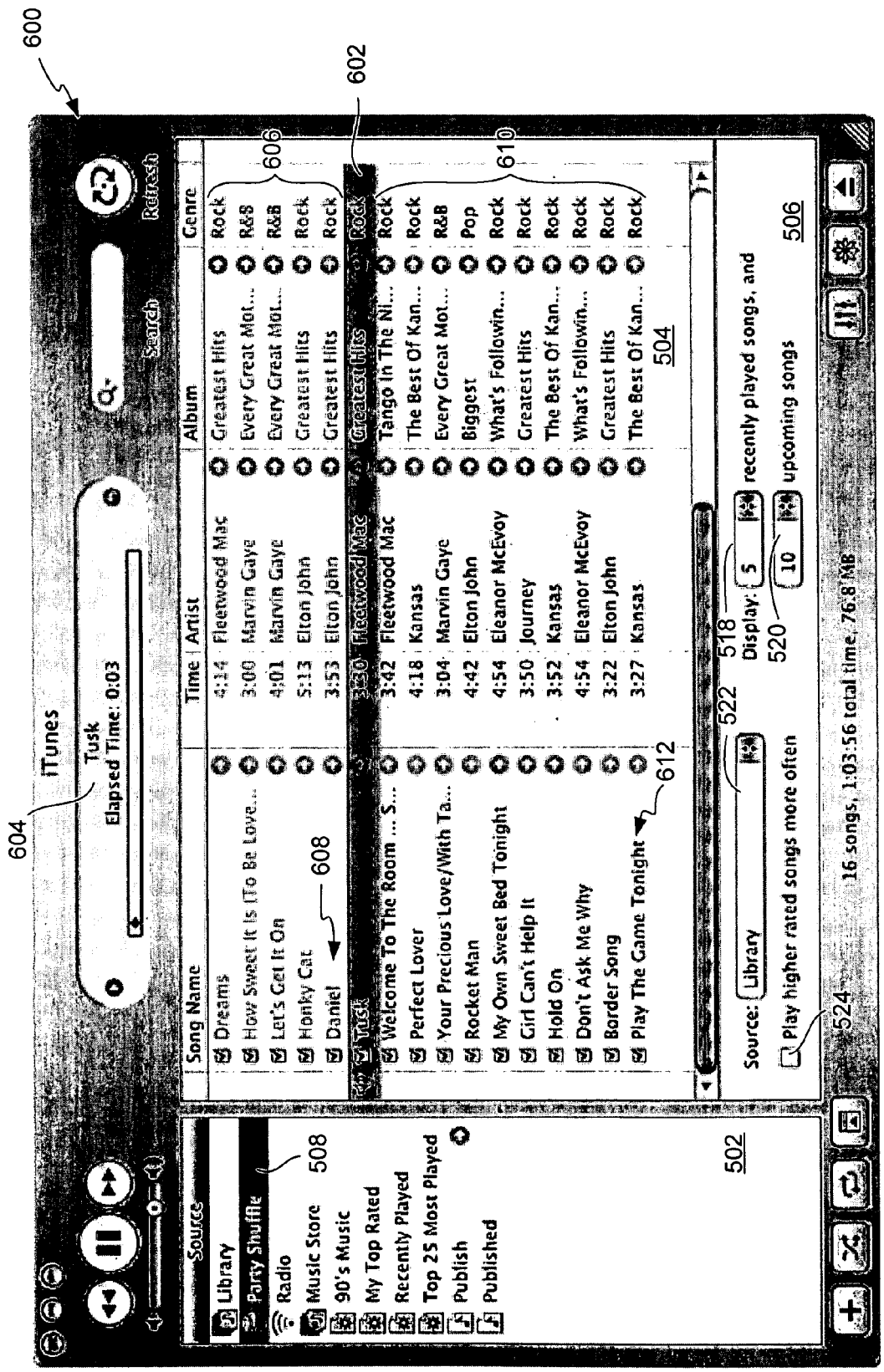

FIGS. 5 and 6 are screen shots of exemplary graphical user interfaces for automated media selection and presentation according to one embodiment of the invention. The graphical user interfaces can be provided by, or associated with, a software application that manages media items.

FIG. 5 is a screen shot of an exemplary graphical user interface 500. The graphical user interface 500 includes a source window 502, a media list window 504, and a user configuration window 506. The source window 502 can be used to select and indicate a source of media items. The available sources include, for example, a library (e.g., all media items on device), a radio (for streaming audio), a music store (for downloading media items), and playlists (e.g., 90's Music, My Top Rated, Recently Played, and Top25 Most Played). The media list window 504 provides descriptive information for media items. The descriptive information can, for example, include song name, time, artist, album and genre. More specifically, the media items are displayed in the media window 504 such that a currently played media item is indicated 510, such as by highlighting (e.g., media item named "Daniel" by the artist Elton John). A play indicator 512 also illustrates the currently played media item and its elapsed (play) time. Here, the currently played media item is an audio file (e.g., song) that the user of the personal computer hears. In addition, the media list window 504 also displays a group of most recently played media items 514 and a group of upcoming media items to be played 516. Display controls 518 and 520 can permit a user to set the number of media items to be displayed in the group of most recently played media items 514 and the group of upcoming media items to be played 516. Still further, a source selector 522 allows the user to choose a source for the media items to be played (and to be associated with the media list window 504), such as the library source as shown in FIG. 5. Finally, the user configuration window 506 includes a bias indicator 524. The bias indicator 524 in FIG. 5 allows the user to bias the otherwise completely random selection of media items to be played from the selected source. In this example, the bias indicator 524 biases the selection of media items from the source such that higher rated media items are played more often. Although the media items displayed in the media list window 504 are normally automatically determined, in one embodiment, a user may be permitted to add or remove a media item from the media list window 504, such as by a drop-and-drag operation.

FIG. 6 is a screen shot of an exemplary graphical user interface 600. The graphical user interface 600 in generally similar to the graphical user interface 500 shown in FIG. 5. However, the graphical user interface 600 represents an example of the graphical user interface 500 after the currently played media item (e.g., "Daniel") ends. Namely, once the currently played media item ends, a new next media item is selected and played. As shown in FIG. 5, the first upcoming media item following "Daniel" is "Tusk." Hence, in FIG. 6, the currently played media item is "Tusk," as indicated 602 in the media list window 504 and a play indicator 604 shown in FIG. 6. In addition, in FIG. 6, the media list window 504 also updates a group of most recently played media items 606 to drop the oldest recently played media item and to add the most recent previously played media item 608 (e.g., "Daniel"), and updates a group of upcoming media items to be played 610 to drop the first upcoming media item (which becomes the currently played media item), and to add a new upcoming media item 612 to the group. In this example, the new upcoming media item 612 is "Play the Game Tonight" by the artist Kansas.

Figure 7:
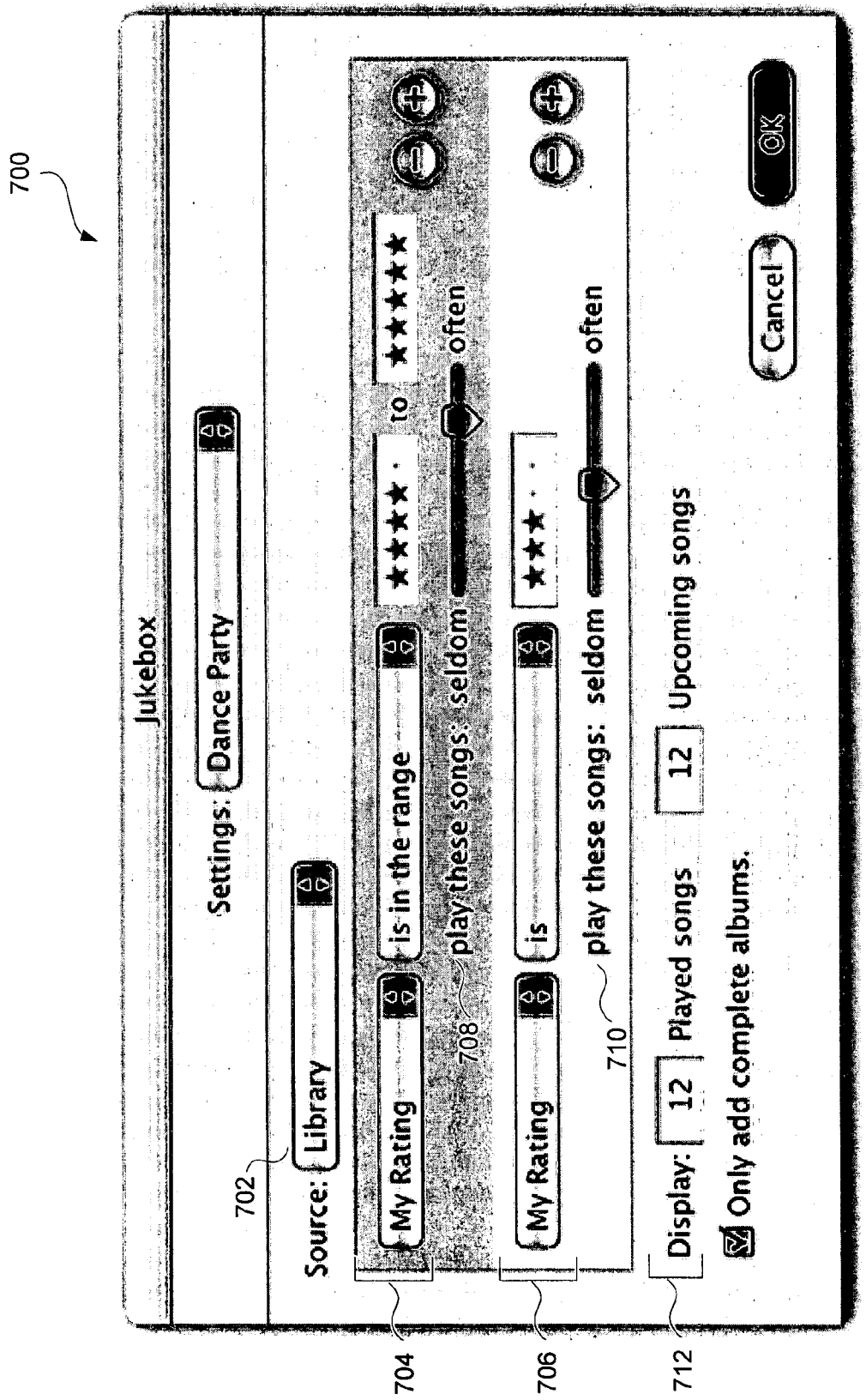
FIG. 7 is a screen shot of an exemplary graphical user interface for assisting a user in providing criteria for media selection and/or presentation according to one embodiment of the invention.

FIG. 7 is a screen shot of an exemplary graphical user interface 700 for assisting a user in providing criteria for media selection and/or presentation according to one embodiment of the invention. The graphical user interface 700 can represent a separate dialog window as shown in FIG. 7. Alternatively, a graphical user interface can be used within the user configuration window 506 of FIGS. 5 and 6. In any case, the graphical user interface 700 can be used to define the rules or conditions for determining media items to be presented. The graphical user interface 700 can also be used to define the manner by which the determined media items are presented. The graphical user interface 700 includes a source selector 702, criteria selectors 704 and 706, importance selectors (e.g., sliders) 708 and 710, and display controls to permit a user to set the number of recently played and upcoming media items to be displayed. In FIG. 7, the criteria selectors 704 and 706 are based on ratings ("My Ratings") and use different star ratings as well as importance values from the importance selectors 708 and 710 to set the criteria for media items from the library to be played. Here, those media items in the library that have four or five star ratings are to be played more often than other media items in the library having three star ratings; however, the particular order in which such media items are played is randomly determined. The criteria selectors 704 and 706 can be based on other criteria besides ratings, for example, a pop-up menu can present available criteria, such as: artist, album, composer, bit rate, date added, genre, play count, name, year, etc., and another pop-up menu can present available rules, such as: contains, does not contain, is, is not, starts with, ends with, in the range, etc.

The invention can be implemented on a host computer (e.g., personal computer) or a portable media player. The processes described with reference to FIGS. 1-4B can be performed by the host computer or the portable media player.

The screen shots provided in FIGS. 5-7 are particularly suitable for use when the invention is implemented on the host computer.

Figure 8:
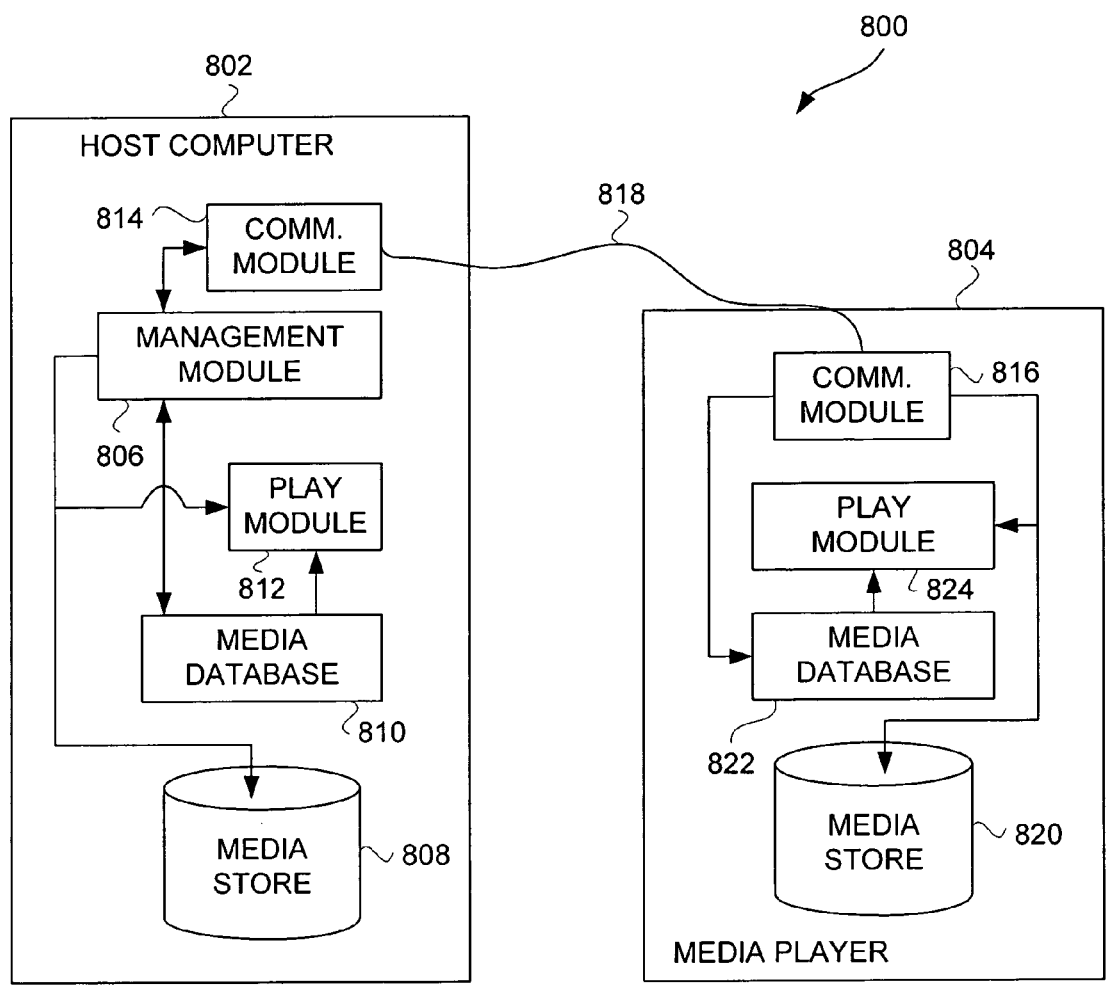
FIG. 8 is a block diagram of a media management system according to one embodiment of the invention.

FIG. 8 is a block diagram of a media management system 800 according to one embodiment of the invention. The media management system 800 includes a host computer 802 and a media player 804. The host computer 802 is typically a personal computer. The host computer, among other conventional components, includes a management module 806 which is a software module. The management module 806 provides for centralized management of media items and playlists on the host computer 802. The management module 806 may also indirectly provide centralized management of media items and playlists on the media player 804. More particularly, the management module 806 manages those media items stored in a media store 808 associated with the host computer 802. The management module 806 also interacts with a media database 810 to store media information and playlists associated with the media items stored in the media store 808. These playlists can be dynamic or non-dynamic.

The media information pertains to characteristics or attributes of the media items (and thus can be considered part of the media content). For example, in the case of audio or audio-visual media, the media information can include one or more of: title, album, track number, artist, composer and genre. The media information can also include year, duration (time) and rating. These types of media information are specific to particular media items. In addition, the media information can pertain to quality characteristics of the media items. Examples of quality characteristics of media items can include one or more of: bit rate, sample rate, equalization setting, and volume adjustment.

The playlists are lists of particular media items. The particular media items for the playlists can be selected automatically using rules (e.g., playlist conditions) or can be manually selected through user interaction with a graphical user interface. The playlists that have their media items selected by rules can be automatically updated (i.e., dynamic) when appropriate so as to maintain its compliance with the rules when the media items available to the host computer 802 change.

Still further, the host computer 802 includes a play module 812. The play module 812 is a software module that can be utilized to play certain media items stored in the media store 808. The play module 812 can also display (on a display screen) or otherwise utilize media information from the media database 810. Typically, the media information of interest corresponds to the media items to be played by the play module 812.

The host computer 802 can also include a communication module 814 that couples to a corresponding communication module 816 within the media player 804. A connection or link 818 removeably couples the communication modules 814 and 816. In one embodiment, the connection or link 818 is a data bus, such as a FIREWIRE bus or USB bus, which is well known in the art.

The media player 804 can also include a media store 820 that stores media items within the media player 804. The media items being stored to the media store 820 are typically received over the connection or link 818 from the host computer 802. More particularly, the management module 806 sends all or certain of those media items residing in the media store 808 over the connection or link 818 to the media store 820 within the media player 804. Additionally, the corresponding media information for the media items that are delivered to the media player 804 from the host computer 802 can be stored in a media database 822. In this regard, certain media information from the media database 810 within the host computer 802 can be sent to the media database 822 within the media player 804 over the connection or link 818.

Still further, playlists identifying certain of the media items can also be sent by the management module 806 over the connection or link 818 to the media store 820 or the media database 822 within the media player 804. In one embodiment, the media player 804 has limited or no capability to manage playlists on the media player 804. However, the management module 806 within the host computer 802, through management of the playlists residing on the host computer, can indirectly manage the playlists residing on the media player 804. In this regard, additions, deletions or changes to playlists can be performed on the host computer 802 and then be carried over to the media player 804 when delivered thereto.

Furthermore, the media player 804 includes a play module 824 that couples to the media store 820 and the media database 822. The play module 824 is a software module that can be utilized to play certain media items stored in the media store 820. The play module 824 can also display (on a display screen) or otherwise utilize media information from the media database 822. Typically, the media information of interest corresponds to the media items to be played by the play module 824.

Hence, in one embodiment, the media player 804 has limited or no capability to manage media items on the media player 804. However, the management module 806 within the host computer 802 can indirectly manage the media items and playlists residing on the media player 804. For example, to "add" a media item to the media player 804, the management module 806 serves to identify the media item to be added to the media player 804 from the media store 808 and then causes the identified media item to be delivered to the media player 804. As another example, to "delete" a media item from the media player 804, the management module 806 serves to identify the media item to be deleted from the media store 808 and then causes the identified media item to be deleted from the media player 804. As still another example, if changes (i.e., alterations) to characteristics of a media item were made at the host computer 802 using the management module 806, then such characteristics can also be carried over to the corresponding media item on the media player 804. In one implementation, the additions, deletions and/or changes occur in a batch-like process during synchronization of the media items on the media player 804 with the media items on the host computer 802.

Figure 9A:
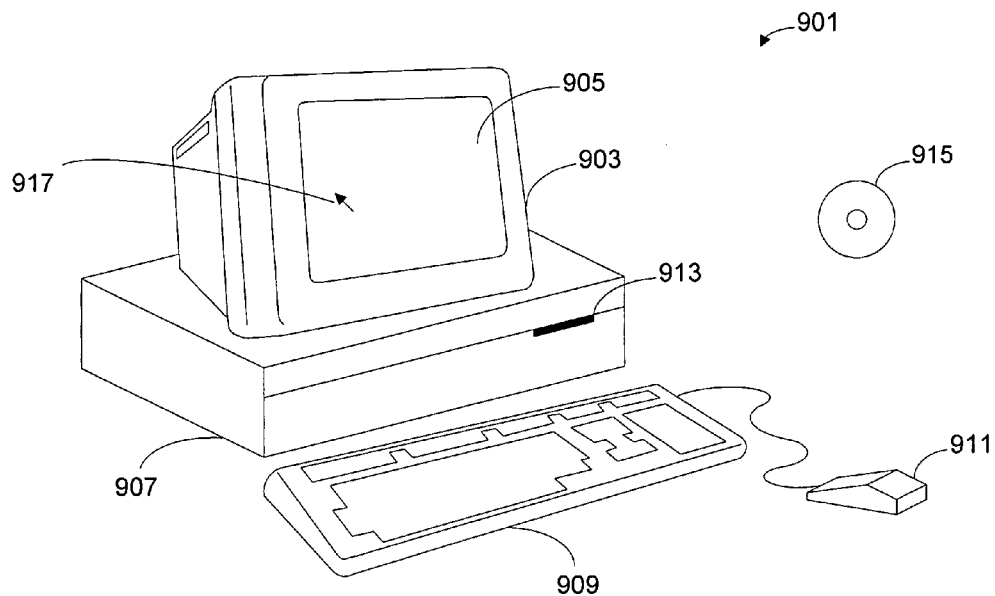
FIGS. 9A and 9B illustrate an exemplary host computer that may be used as a media device to select and present media items in accordance with one embodiment of the invention.
Figure 9B:
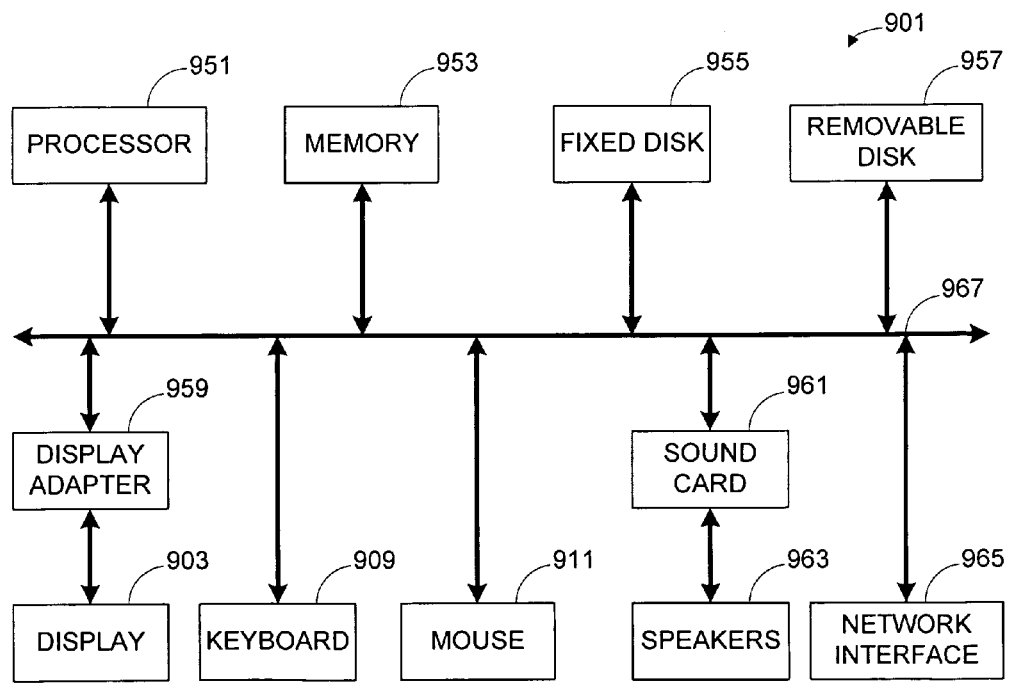

FIGS. 9A and 9B illustrate an exemplary host computer that may be used as a media device to select and present media items in accordance with one embodiment of the invention.

FIG. 9A shows a computer system 901 that includes a display monitor 903 having a single or multi-screen displays 905 (or multiple displays), a cabinet 907, a keyboard 909, and a mouse 911. A cursor image 917 is illustrated on the display 905. The cursor image 917 is typically used for indicating the user's position on the display. Typically the cursor image 917 is moved about the display 905 through user input either through the keyboard 909, the mouse 911, or through another device (e.g., button, stylus, input pad or joystick). The cabinet 907 houses a drive 913, such as a CD-ROM or floppy drive, system memory and a hard drive (see FIG. 9B) which may be utilized to store and retrieve a software program (computer program) incorporating computer code that implements the present invention, store data (e.g., media data) for use with the invention, and the like. Although CD-ROM 915 is shown as an exemplary computer readable storage medium, other computer readable storage media including floppy disk, tape, flash memory, system memory, and hard drive may be utilized. Additionally, a data signal embodied in a carrier way (e.g., in a network including the Internet) may be the computer readable storage medium.

FIG. 9B shows a system block diagram of the computer system 901 shown in FIG. 9A. As in FIG. 9A, the computer system 901 includes the display monitor 903, the keyboard 909, and the mouse 911. The computer system 901 further includes subsystems such as a central processor 951, system memory 953, fixed storage 955 (e.g., hard drive), removable storage 957 (e.g., CD-ROM drive), display adapter 959, sound card 961, speakers 963, and network interface 965. The system bus architecture of computer system 901 is represented by arrows 967. However, these arrows are illustrative of any interconnection scheme serving to link the subsystems. For example, a local bus could be utilized to connect the central processor to the system memory and display adapter. The computer system 901 shown in FIG. 9B is but an example of a computer system suitable for use with the invention. Other computer architectures having different configurations of subsystems may also be utilized.

Although the media items of emphasis in several of the above embodiments were audio items (e.g., audio files or songs), it should be understood that the media items are not limited to audio items. For example, the media item can alternatively pertain to videos (e.g., movies) or images (e.g., photos).

The various aspects, embodiments, implementations or features of the invention can be used separately or in any combination.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that media can be continuously presented at a media device without requiring continuous user interaction. For example, a user can set criteria and then initiate the presentation, and then the media device can continuously present media at the media device. Another advantage of the invention is that a user of the media device can bias the presentation to certain types or classifications of the media items. Still another advantage of the invention is that a user interface at the media device can simultaneously display information pertaining to the media items recently presented, being presented and to be presented.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for using a computing device to play media items using a media player operating on the computing device, said method comprising:
   (a) identifying a source for a plurality of media items available to be played;
   (b) obtaining at least one criterion for use in selection of the plurality of media items to be played from the source;
   (c) determining a set of media items to be played based upon the plurality of media items available from the source based on the at least one criterion; and
   (d) playing the determined set of media items on the media player,
   wherein the at least one criterion is a user-selected criterion,
   wherein each of the plurality of media items to be played has a rating value associated therewith,
   wherein the media items to be played are played in a random order influenced by the user-selected criterion, and
   wherein the at least one criterion causes a first media item with a first rating value to be more likely chosen by said determining (c) to be included in the set of media items than a second media item with a second rating value, if the first rating value is greater that the second rating value.

2. A method as recited in claim 1, wherein the media items are songs.

3. A method as recited in claim 1, wherein said method operates to repeat said determining (c) and said playing (d) so as to continuously play media items from the source.

4. A method as recited in claim 1, wherein said method comprises:
   (e) displaying, on a display of the media player, a list of media items, the list including the determined set of media items, a plurality of recently played media items, and a plurality of upcoming media items.

5. A method as recited in claim 4,
   wherein the media items are songs, and
   wherein said method operates to repeat said determining (c) and said playing (d) so as to continuously play media items from the source.

6. An automatic media presentation method for using a computing device to present media items on a media device, said method comprising:
   (a) identifying a source for a plurality of media items available to be played;
   (b) determining a set of media items to be played from the source based on at least one criterion;
   (c) presenting the determined set of media items on the media device;
   (d) repeating said determining (b) and said presenting (c) so as to automatically and continuously present sets of the plurality of media items on the media device; and
   (f) playing the set of media items on the media device,
   wherein the at least one criterion is a user-selected criterion,
   wherein each of the plurality of media items to be played has a rating value associated therewith,
   wherein the plurality of media items to be played are played in a random order influenced by the user-selected criterion, and
   wherein the at least one criterion causes a first media item with a first rating value to be more likely chosen by said determining (b) to be included in the set of media items than a second media item with a second rating value, if the first rating value is greater that the second rating value.

7. An automatic media presentation method as recited in claim 6, wherein the media device is a media player.

8. An automatic media presentation method as recited in claim 6, wherein the media items are songs, and wherein said presenting (c) plays the songs.

9. An automatic media presentation method as recited in claim 6, wherein the media items are images, and wherein said presenting (c) displays the images.

10. An automatic media presentation method as recited in claim 6, wherein said determining (b) comprises:
associating weighting values to each of the set of media items within the source; and
randomly selecting the set of media items from the source giving effect to the weighting values.

11. An automatic media presentation method as recited in claim 10, wherein the media device is a media player.

12. An automatic media presentation method as recited in claim 11, wherein the media items are songs, and wherein said presenting (c) plays the songs.

13. An automatic media presentation method as recited in claim 11, wherein the media items are images, and wherein said presenting (c) displays the images.

14. An automatic media presentation method as recited in claim 6, wherein said determining (b) comprises:
(b1) obtaining a first user criterion and a first importance value;
(b2) determining a first set of the media items from the source that satisfy the first user criterion;
(b3) obtaining a second user criterion and a second importance value;
(b4) determining a second set of the media items from the source that satisfy the second user criterion;
(b5) randomly selecting one of the first set and the second set based on the first importance value and the second importance value; and
(b6) randomly selecting one of the media items on the selected one of the first set and the second set.

15. An automatic media presentation method as recited in claim 14, wherein said selecting (b5) comprises:
determining a relative importance from the first importance value and the second importance value; and
randomly selecting one of the first set and the second set biased in accordance with the relative importance.

16. An automatic media presentation method as recited in claim 15, wherein the media device is a media player, and
wherein the media items are audio or image files, and
wherein said presenting (c) plays the audio files or displays the image files.

17. A method as recited in claim 6, wherein said presenting (c)) comprises:
(c1) displaying information pertaining to the determined set of media items on a display of the media device; and
(c2) playing the set of media items on the media device.

18. A method as recited in claim 17, wherein said method further comprises identifying at least one display preference, and
wherein said displaying (c1) is performed in accordance with the least one display preference.

19. A method as recited in claim 18, wherein the at least one display preference specifies at least one of a number of recently played media items and a number of upcoming media items.

20. A method as recited in claim 19, wherein said displaying (c1) simultaneously displays, on the display, information on each of the number of recently played media items as well as information on each of the number of upcoming media items.

21. A computing device including a display and a processor, said computing device being configured to:
identify a source for a plurality of media items available to be played;
determine a set of media items to be played based upon the plurality of media items available from the source based on at least one criterion;
wherein the at least one criterion is a user-selected criterion,
present the determined set of media items on the media device; and
repeat said determine and said present so as to automatically and continuously present sets of media items on the media device,
wherein each of the media items to be played has a rating value associated therewith,
wherein the media items to be played are played in a random order influenced by the user-selected criterion, and
wherein the at least one criterion causes a first media item with a first rating value to be more likely chosen by said determine to be included in the set of media items than a second media item with a second rating value, if the first rating value is greater that the second rating value.

22. A device as recited in claim 21, further comprising a list including at least a plurality of name, time, artist, album and genre.

23. A device as recited in claim 21, further comprising:
a media source selector that enables a user of the media player to select one of a plurality of media sources to be the media source.

24. A device as recited in claim 23, further comprising:
a media window selector that enables the user to control at least one attribute of a media display window.

25. A device as recited in claim 24, wherein the attribute pertains to at least one of a number of recently played media items and a number of upcoming media items.

26. A device as recited in claim 21, further comprising a first region of a display window providing said media source indication on a display of the media player, a second region of the display window providing a list of information, and a third region of the display window providing a user interface control device.

27. A device as recited in claim 21, wherein the rating value is determined by user rating imposed on the media items.

28. A computer program storage device storing a program of instructions executable by a machine to perform a method for presenting media items on a media device, the method comprising:
identifying a source for a plurality of media items available to be played;
determining a set of media items to be played based upon the plurality of media items available from the source based on at least one criterion;
wherein the at least one criterion is a user-selected criterion,
presenting the determined set of media items on the media device; and
repeating said determining and said presenting so as to automatically and continuously present sets of media items on the media device,
wherein each of the media items to be played has a rating value associated therewith, wherein the media items to be played are played in a random order influenced by the user-selected criterion, and wherein the at least one criterion causes a first media item with a first rating value to be more likely chosen by said determining to be included in the set of media items than a second media item with a second rating value, if the first rating value is greater that the second rating value.

29. A computer program storage device storing a program of instructions executable by a machine to perform a method for presenting media items on a media device, the method comprising:

identifying a source for a plurality of media items available to be played;

determining a set of media items to be played based upon the plurality of media items available from the source based on at least one criterion;

randomly selecting an available media item from the set of media items based on at least one criterion;

wherein the at least one criterion is a user-selected criterion, associating a rating value with each of the available media items; and presenting the selected media item on the media device, repeating said selecting and said presenting so as to automatically and continuously present media items on the media device, wherein the at least one criterion causes a first media item of the plurality of available media items with a first rating value to be more likely chosen by said determining to be included in the set of media items than a second media item of the plurality of available media items if the first rating value is greater that the second rating value.

30. A computer program storage device as recited in claim 29, wherein the at least one criterion is predetermined by a user of the media device.

31. A computer program storage device as recited in claim 29, wherein the at least one criterion includes at least one user-configured rule.

32. A computer program storage device as recited in claim 31, wherein the at least one user-configured rule is based on at least one media attribute associated with the plurality of available media items.

33. A computer program storage device as recited in claim 29, wherein the at least one criterion influences the random selection of certain of the media items within the plurality of available media items.

34. A computer program storage device as recited in claim 29, wherein the at least one criterion is based on at least one media attribute associated with the plurality of available media items.

35. A computer program storage device as recited in claim 33, wherein the at least one criterion includes or uses at least one importance indication.

36. A computer program storage device as recited in claim 29, wherein the at least one criterion includes a range for the at least one criterion.

37. A computer program storage device as recited in claim 29, wherein said computer readable medium further comprises:

computer program code for repeating said computer program code for selecting and said computer program code for presenting so as to automatically and continuously present media items on the media device.

38. A method of automatically selecting media items from a source library for presentation using a media player, said method comprising:

receiving a user selection of at least one criterion to be used in selecting a plurality of media items from the library;

determining a set of media items available from the plurality of media items selected from the library for presentation using the at least one criterion; and presenting the determined set of media items using the media player on a media device, wherein said determining includes at least selecting randomly from the media items in the library that satisfy the at least one criterion, wherein the at least one criterion is a user-selected criterion, repeating said determining and said presenting so as to automatically and continuously present selected ones of the media items on the media device, wherein each of the media items to be presented has a rating value associated therewith, and wherein the at least one criterion causes a first media item with a first rating value to be more likely chosen by said determining to be included in the set of media items than a second media item with a second rating value, if the first rating value is greater that the second rating value.

39. A method as recited in claim 38, further comprising:

(d) receiving a user selection of the library.

40. A method as recited in claim 38, where said at least one criterion includes one or more of the following: media item artist, media item play length, media item genre, media item name, media item composer, and media item date.

41. A method as recited in claim 38, where said at least one criterion includes one or more of the following: media item play count, a user-selected media item rating, and media item date.

42. A method as recited in claim 38, where said at least one criterion includes a weighting to be applied to the media items in said determining.

43. A method of configuring criteria for selecting media items to be presented using a media playback device, said method comprising:

receiving a user selection of at least one criterion to be used for selecting a plurality of media items from a source library;

receiving a user selection of a range of rating values for said at least one criterion;

determining a set of media items based upon the plurality of media items from the source library for presentation using the at least one criterion and the range of rating values; and wherein said determining includes at least selecting randomly from the plurality of media items in the source library that satisfy the at least one criterion, presenting the determined set of media items using the media playback device, wherein said determining includes at least selecting randomly from the plurality of media items in the source library that satisfy the at least one criterion, wherein the at least one criterion is a user-selected criterion, wherein each of the set of media items to be presented has a rating value associated therewith, and wherein the at least one criterion causes a first media item with a first rating value to be more likely chosen by said determining to be included in the set of media items than a second media item with a second rating value, if the first rating value is greater that the second rating value.

44. A method as recited in claim 43, wherein said method further comprises:

receiving a weighing factor to be applied in selecting the set of media items for which the at least at least one criterion falls within the range of values.

45. A method of configuring criteria for selecting media items to be presented using a media playback device, said method comprising:
- receiving at least one user-configured rule to be used for selecting a plurality of media items from a source of media items;
- determining a set of media items based upon the plurality of media items selected from the source of media items for presentation using the at least one user-configured rule;
- wherein said determining includes at least selecting randomly from the plurality of media items that satisfy the at least one user-configured rule,
- associating a rating value with each of the media items to be played; and
- presenting the determined set of media items using the media playback device,
- wherein the at least one criterion causes a first media item with a first rating value to be more likely chosen by said determining to be included in the set of media items than a second media item with a second rating value, if the first rating value is greater that the second rating value.

46. A method as recited in claim 45, wherein the user-configured rule is applied against attributes of each of the set of media items during said determining.

47. A method as recited in claim 45, wherein the user-configured rule includes a range of values for the user-configured rule.

48. A method as recited in claim 45, wherein the user-configured rules includes or uses an importance indication.

49. A method as recited in claim 45, wherein the user-configured rules includes a range.

50. A method as recited in claim 45, wherein said method operates to repeat said determining and said presenting so as to continuously present media items.

51. A computer program storage device tangibly storing a program of instructions executable by a machine to perform a method for selecting media items to be presented on a media device, the method comprising:
- receiving at least one user-configured rule to be used for selecting a plurality of media items from a source of media items;
- determining a set of media items based upon the plurality of media items selected from the source of media items for presentation using the at least one user-configured rule;
- wherein said determining includes at least selecting randomly from the plurality of media items that satisfy the at least one user-configured rule,
- associating a rating value with each of the media items to be played; and
- presenting the determined set of media items using the media playback device,
- wherein the at least one criterion causes a first media item with a first rating value to be more likely chosen by said determining to be included in the set of media items than a second media item with a second rating value, if the first rating value is greater that the second rating value.

\* \* \* \* \*

UNITED STATES PATENT AND TRADEMARK OFFICE
CERTIFICATE OF CORRECTION

| | | |
|---|---|---|
| PATENT NO. | : 7,827,259 B2 | Page 1 of 1 |
| APPLICATION NO. | : 10/833399 | |
| DATED | : November 2, 2010 | |
| INVENTOR(S) | : David Heller et al. | |

It is certified that error appears in the above-identified patent and that said Letters Patent is hereby corrected as shown below:

In column 13, line 53, in claim 17, delete "(c))" and insert -- (c) --, therefor.

Signed and Sealed this

Twenty-second Day of November, 2011

David J. Kappos
*Director of the United States Patent and Trademark Office*